(12) United States Patent
Ochiai et al.

(10) Patent No.: US 9,132,630 B2
(45) Date of Patent: Sep. 15, 2015

(54) IMAGE PROCESSING APPARATUS AND IMAGE PROCESSING METHOD

(71) Applicant: CANON KABUSHIKI KAISHA, Tokyo (JP)

(72) Inventors: Takashi Ochiai, Machida (JP); Tomokazu Yanai, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/591,441

(22) Filed: Jan. 7, 2015

(65) Prior Publication Data
US 2015/0197086 A1    Jul. 16, 2015

(51) Int. Cl.
*B41J 2/205* (2006.01)
*B41J 2/045* (2006.01)
*H04N 1/405* (2006.01)
*G06K 15/10* (2006.01)

(52) U.S. Cl.
CPC ............ *B41J 2/04593* (2013.01); *B41J 2/2056* (2013.01); *G06K 15/102* (2013.01); *G06K 15/107* (2013.01); *H04N 1/4055* (2013.01)

(58) Field of Classification Search
CPC .... B41J 2/2056; B41J 2/2054; B41J 2/04593; G06K 15/107; G06K 15/102; G06K 2215/0094; G06K 2215/101; H04N 1/4055
USPC ................ 347/5, 9, 14, 15; 358/1.12, 1.8, 1.9
See application file for complete search history.

(56) References Cited

U.S. PATENT DOCUMENTS 7,929,156 B2 * 4/2011 Kakutani .................... 358/1.12
8,253,980 B2 * 8/2012 Murayama et al. .......... 358/3.06
8,451,493 B2 * 5/2013 Noguchi et al. ............... 358/1.8

FOREIGN PATENT DOCUMENTS

JP    2010-260355    11/2010
JP    2013-38643     2/2013

* cited by examiner

*Primary Examiner* — An Do
(74) *Attorney, Agent, or Firm* — Fitzpatrick, Cella, Harper & Scinto

(57) ABSTRACT

There is provided an image processing method that can output a high-quality image having high dispersing quality in the configuration for printing an image using a plurality of different kinds of dots. Therefore in the same region of a printing medium, binary data is generated such that a low frequency component of space frequency characteristics is suppressed with priority to a dot pattern of a combination in which a plurality of kinds of dots are relatively noticeable.

14 Claims, 21 Drawing Sheets

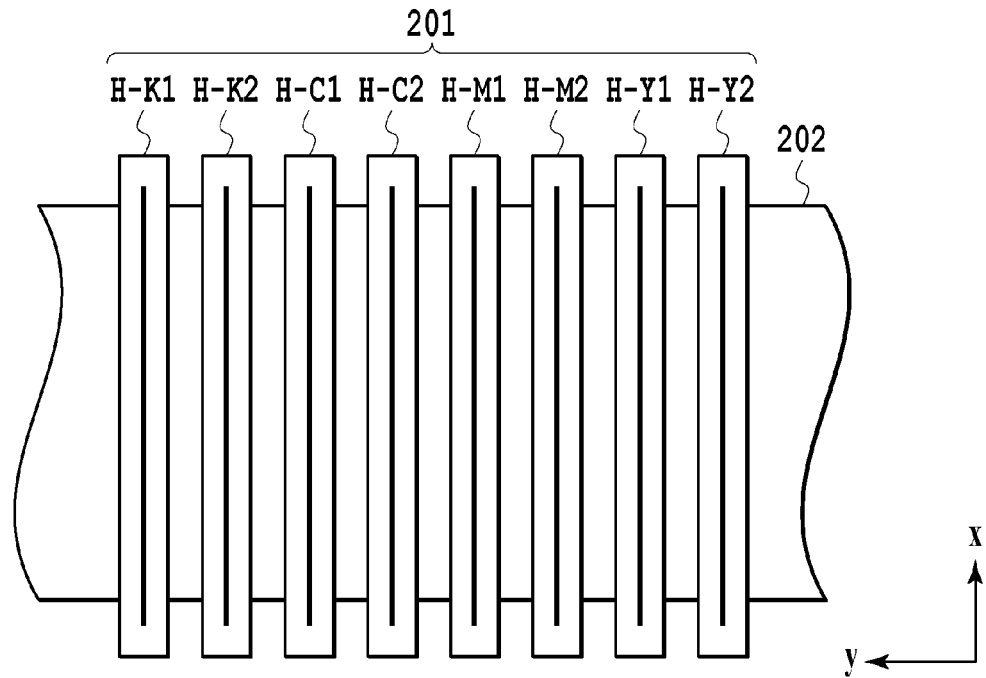
FIG.2A
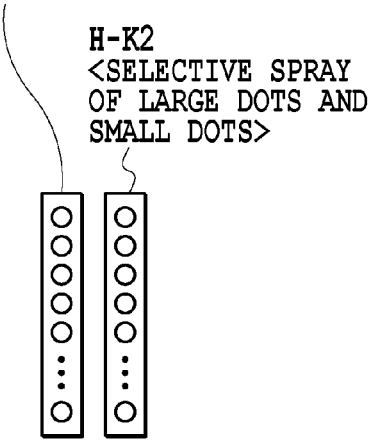
FIG.2B
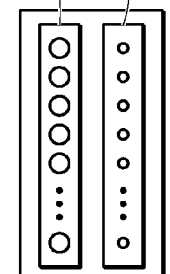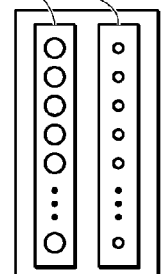
FIG.2C

Th

| 1 | 136 | 34 | 170 |
|---|---|---|---|
| 204 | 68 | 238 | 102 |
| 51 | 187 | 17 | 153 |
| 255 | 119 | 221 | 85 |

PRINT HEAD 1 / LARGE DOT (PRIORITY ORDER NUMBER 1)

O_C_d(1,0)
| 51 | 51 | 51 | 51 |
|----|----|----|----|
| 51 | 51 | 51 | 51 |
| 51 | 51 | 51 | 51 |
| 51 | 51 | 51 | 51 |

~2101

Out_O_C(1,0)
| 255 | 0 | 255 | 0 |
|-----|---|-----|---|
| 0 | 0 | 0 | 0 |
| 255 | 0 | 255 | 0 |
| 0 | 0 | 0 | 0 |

~2102

Out_C(1,0)
| 255 | 0 | 255 | 0 |
|-----|---|-----|---|
| 0 | 0 | 0 | 0 |
| 255 | 0 | 255 | 0 |
| 0 | 0 | 0 | 0 |

~2105

U_C_d(1,0)
| 0 | 0 | 0 | 0 |
|---|---|---|---|
| 0 | 0 | 0 | 0 |
| 0 | 0 | 0 | 0 |
| 0 | 0 | 0 | 0 |

~2103

Out_U_C(1,0)
| 0 | 0 | 0 | 0 |
|---|---|---|---|
| 0 | 0 | 0 | 0 |
| 0 | 0 | 0 | 0 |
| 0 | 0 | 0 | 0 |

~2104

PRINT HEAD 1 / SMALL DOT (PRIORITY ORDER NUMBER 3)

O_C_d(1,1)
| 146 | 146 | 146 | 146 |
|-----|-----|-----|-----|
| 146 | 146 | 146 | 146 |
| 146 | 146 | 146 | 146 |
| 146 | 146 | 146 | 146 |

~2111

Out_O_C(1,1)
| 255 | 255 | 255 | 0 |
|-----|-----|-----|---|
| 0 | 255 | 0 | 255 |
| 255 | 0 | 255 | 0 |
| 0 | 255 | 0 | 255 |

~2112

Out_C(1,1)
| 0 | 255 | 0 | 0 |
|---|-----|---|---|
| 0 | 0 | 0 | 0 |
| 0 | 0 | 0 | 0 |
| 0 | 255 | 0 | 0 |

~2115

U_C_d(1,1)
| 102 | 102 | 102 | 102 |
|-----|-----|-----|-----|
| 102 | 102 | 102 | 102 |
| 102 | 102 | 102 | 102 |
| 102 | 102 | 102 | 102 |

~2113

Out_U_C(1,1)
| 255 | 0 | 255 | 0 |
|-----|---|-----|---|
| 0 | 255 | 0 | 255 |
| 255 | 0 | 255 | 0 |
| 0 | 0 | 0 | 255 |

PRINT HEAD 2 / LARGE DOT (PRIORITY ORDER NUMBER 2)

O_C_d(2,0)

| 102 | 102 | 102 | 102 |
|---|---|---|---|
| 102 | 102 | 102 | 102 |
| 102 | 102 | 102 | 102 |
| 102 | 102 | 102 | 102 |

~2106

Out_O_C(2,0)

| 255 | 0 | 255 | 0 |
|---|---|---|---|
| 0 | 255 | 0 | 255 |
| 255 | 0 | 255 | 0 |
| 0 | 0 | 0 | 255 |

~2107

Out_C(2,0)

| 0 | 0 | 0 | 0 |
|---|---|---|---|
| 0 | 255 | 0 | 255 |
| 0 | 0 | 0 | 0 |
| 0 | 0 | 0 | 255 |

~2110

U_C_d(2,0)

| 51 | 51 | 51 | 51 |
|---|---|---|---|
| 51 | 51 | 51 | 51 |
| 51 | 51 | 51 | 51 |
| 51 | 51 | 51 | 51 |

~2108

Out_U_C(2,0)

| 255 | 0 | 255 | 0 |
|---|---|---|---|
| 0 | 0 | 0 | 0 |
| 255 | 0 | 255 | 0 |
| 0 | 0 | 0 | 0 |

~2109

PRINT HEAD 2 / SMALL DOT (PRIORITY ORDER NUMBER 4)

O_C_d(2,1)

| 190 | 190 | 190 | 190 |
|---|---|---|---|
| 190 | 190 | 190 | 190 |
| 190 | 190 | 190 | 190 |
| 190 | 190 | 190 | 190 |

~2116

Out_O_C(2,1)

| 255 | 255 | 255 | 255 |
|---|---|---|---|
| 0 | 255 | 0 | 255 |
| 255 | 255 | 255 | 255 |
| 0 | 255 | 0 | 255 |

~2117

Out_C(2,1)

| 0 | 0 | 0 | 255 |
|---|---|---|---|
| 0 | 0 | 0 | 0 |
| 0 | 255 | 0 | 255 |
| 0 | 0 | 0 | 0 |

~2120

U_C_d(2,1)

| 146 | 146 | 146 | 146 |
|---|---|---|---|
| 146 | 146 | 146 | 146 |
| 146 | 146 | 146 | 146 |
| 146 | 146 | 146 | 146 |

~2118

Out_U_C(2,1)

| 255 | 255 | 255 | 0 |
|---|---|---|---|
| 0 | 255 | 0 | 255 |
| 255 | 0 | 255 | 0 |
| 0 | 255 | 0 | 255 |

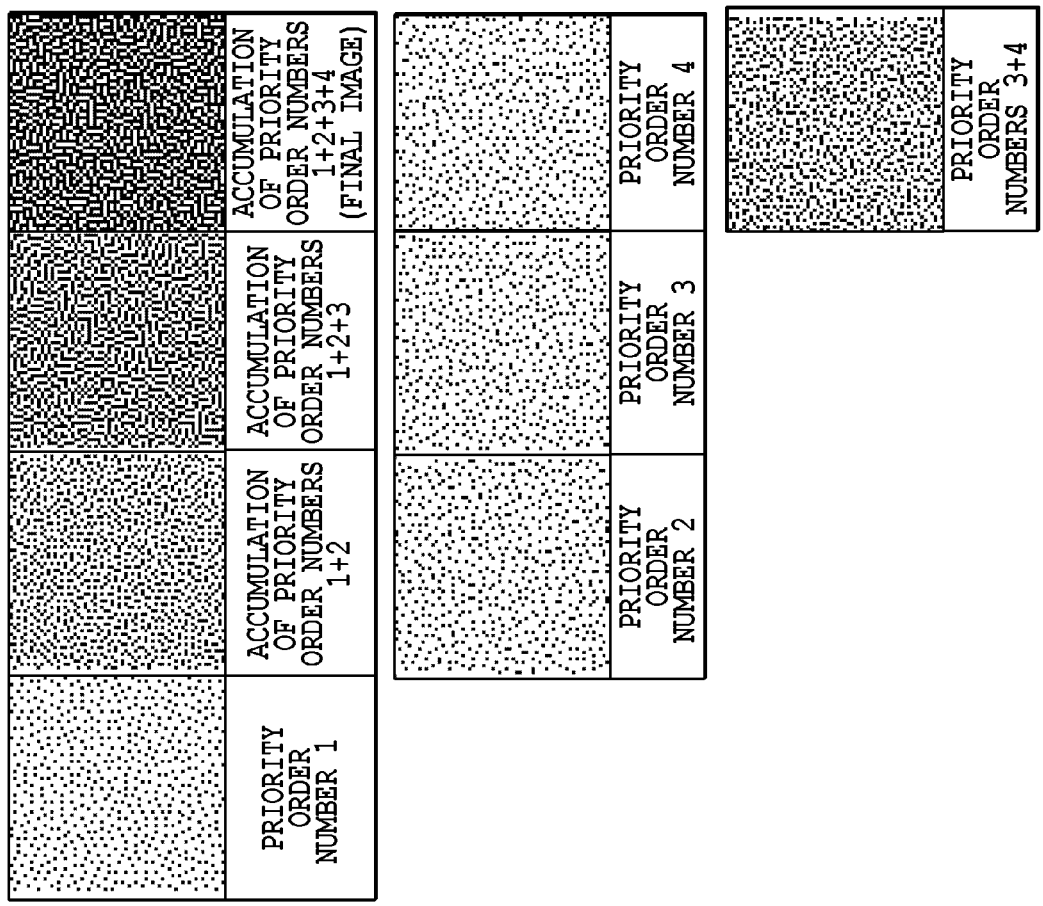

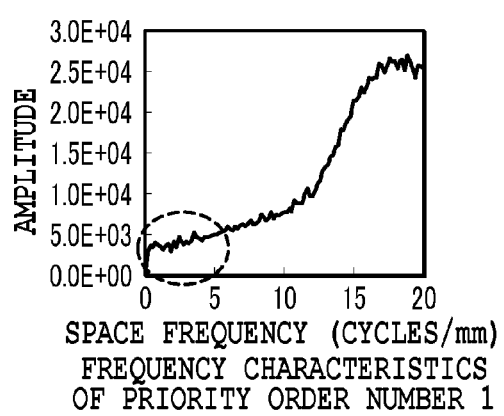
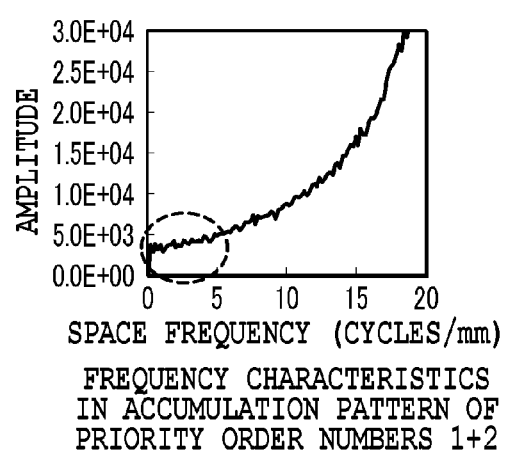
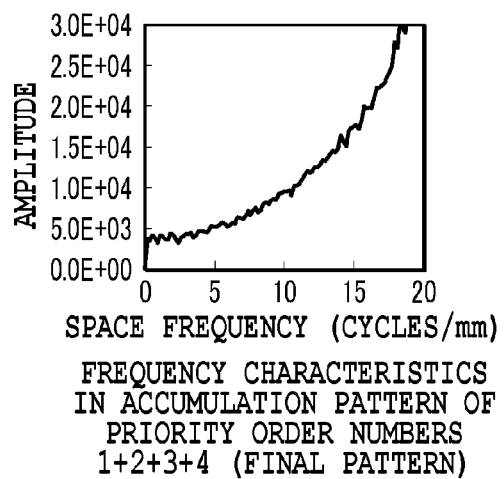
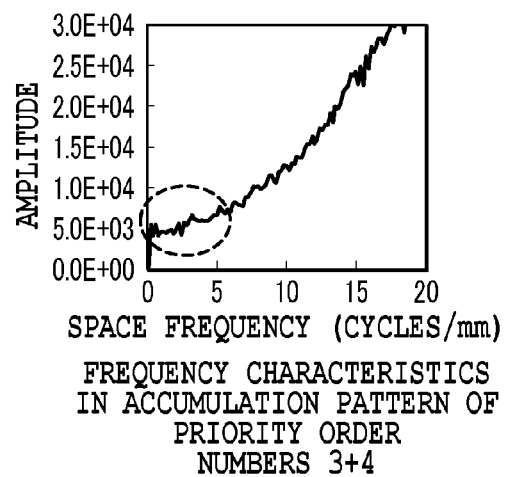
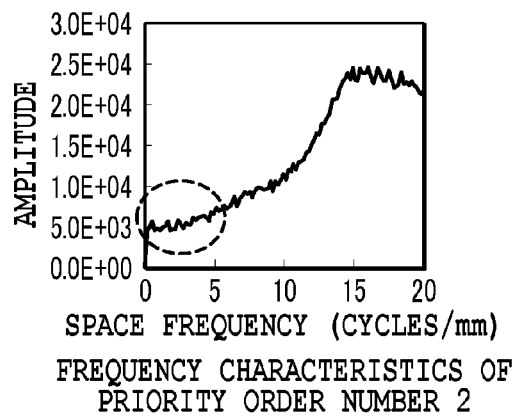
FIG.12B

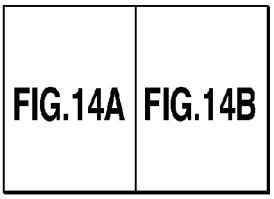

FIG.14B

PRINT HEAD 1 / SMALL DOT (PRIORITY ORDER NUMBER 2)

O_C_d(1,1)

| 95 | 95 | 95 | 95 |
|---|---|---|---|
| 95 | 95 | 95 | 95 |
| 95 | 95 | 95 | 95 |
| 95 | 95 | 95 | 95 |

~2106

Out_O_C(1,1)

| 255 | 0 | 255 | 0 |
|---|---|---|---|
| 0 | 255 | 0 | 0 |
| 255 | 0 | 255 | 0 |
| 0 | 0 | 0 | 255 |

~2107

Out_C(1,1)

| 0 | 0 | 0 | 0 |
|---|---|---|---|
| 0 | 255 | 0 | 0 |
| 0 | 0 | 0 | 0 |
| 0 | 0 | 0 | 255 |

~2110

U_C_d(1,1)

| 51 | 51 | 51 | 51 |
|---|---|---|---|
| 51 | 51 | 51 | 51 |
| 51 | 51 | 51 | 51 |
| 51 | 51 | 51 | 51 |

~2108

Out_U_C(1,1)

| 255 | 0 | 255 | 0 |
|---|---|---|---|
| 0 | 0 | 0 | 0 |
| 255 | 0 | 255 | 0 |
| 0 | 0 | 0 | 0 |

~2109

PRINT HEAD 2 / SMALL DOT (PRIORITY ORDER NUMBER 4)

O_C_d(2,1)

| 190 | 190 | 190 | 190 |
|---|---|---|---|
| 190 | 190 | 190 | 190 |
| 190 | 190 | 190 | 190 |
| 190 | 190 | 190 | 190 |

~2116

Out_O_C(2,1)

| 255 | 255 | 255 | 255 |
|---|---|---|---|
| 0 | 255 | 0 | 255 |
| 255 | 255 | 255 | 255 |
| 0 | 255 | 0 | 255 |

~2117

Out_C(2,1)

| 0 | 0 | 0 | 255 |
|---|---|---|---|
| 0 | 0 | 0 | 0 |
| 0 | 255 | 0 | 255 |
| 0 | 0 | 0 | 0 |

~2120

U_C_d(2,1)

| 146 | 146 | 146 | 146 |
|---|---|---|---|
| 146 | 146 | 146 | 146 |
| 146 | 146 | 146 | 146 |
| 146 | 146 | 146 | 146 |

~2118

Out_U_C(2,1)

| 255 | 255 | 255 | 0 |
|---|---|---|---|
| 0 | 255 | 0 | 255 |
| 255 | 0 | 255 | 0 |
| 0 | 255 | 0 | 255 |

~2119

2201

| Th_1 | | | | Th_2 | | | | | Th_n | | | |
|---|---|---|---|---|---|---|---|---|---|---|---|---|
| 0 | 136 | 34 | 170 | 34 | 170 | 0 | 136 | | 170 | 0 | 136 | 34 |
| 204 | 68 | 238 | 102 | 238 | 102 | 204 | 68 | ... | 102 | 204 | 68 | 238 |
| 51 | 187 | 17 | 153 | 17 | 153 | 51 | 187 | | 153 | 51 | 187 | 17 |
| 255 | 119 | 221 | 85 | 221 | 85 | 255 | 119 | | 85 | 255 | 119 | 221 |

FIG.18

IMAGE PROCESSING APPARATUS AND IMAGE PROCESSING METHOD

BACKGROUND OF THE INVENTION

1. Field of the Invention

The present invention relates to an image processing apparatus and an image processing method which form an image on a printing medium by printing a plurality of kinds of dots differing in size or density.

2. Description of the Related Art

An image printing apparatus used as output equipment such as a computer or a word processor prints an image (including characters, codes and the like) based upon image data. There are known an inkjet type, a wired dot type, a thermal type, a laser beam type, an LED type and the like as printing types.

In general, in many cases the gradation number expressible in the image printing apparatus is smaller than that of image data used in an input apparatus such as a personal computer. Therefore in many cases there is prepared the method (what is called halftone processing) for converting the gradation number of the image data used in the personal computer into the gradation number expressible in the image printing apparatus. There is known an error diffusion method or a dither method as the method of the halftone processing. The error diffusion method is advantageous in a point of being capable of acquiring an image that is high in dispersing quality, but is disadvantageous in a point of being large in processing loads. On the other hand, the dither method is a method for reducing the gradation number by comparing multi-valued image data with a threshold in advance prepared, and is smaller in processing loads than the error diffusion method. In recent years, there is proposed a method using a threshold matrix having blue noise characteristics, for realizing the dispersing quality that is equivalent to that of the error diffusion method also in the dither method.

For example, Japanese Patent Laid-Open No. 2010-260355 discloses a method in which blue noise characteristics are given to each of a plurality of dot groups that is estimated to have a physical difference, as a dot pattern to be printed in a forward pass and a dot pattern to be printed in a backward pass in a serial type printing apparatus. In addition, Japanese Patent Laid-Open No. 2013-38643 discloses a method in which in the configuration of printing in the same region of a printing medium in stages by a plurality of scans, space frequency characteristics of a dot pattern are made to blue noises in the process where dot patterns are accumulated in stages.

However, in Japanese Patent Laid-Open No. 2010-260355 or Japanese Patent Laid-Open No. 2013-38643, a case of printing a single kind of dots equal in color, size, density and the like is taken into account, but a case of printing a plurality of kinds of dots differing in color, size, density and the like is not sufficiently taken into account. As a result, there are some cases where even if the dispersing quality in the dot pattern by the single kind of dots is high, the equivalent dispersing quality cannot be obtained in the dot pattern by a plurality of kinds of dots. That is, in a case of printing a plurality of different kinds of dots, even if Japanese Patent Laid-Open No. 2010-260355 or Japanese Patent Laid-Open No. 2013-38643 is adopted, when a slight shift between dot patterns occurs, unfortunately the granularity may deteriorate to damage the image.

SUMMARY OF THE INVENTION

The present invention is made for solving the foregoing problem, and an object of the present invention is to provide an image processing apparatus and an image processing method that can output a high-quality image having high dispersing quality in the configuration for printing an image using a plurality of different kinds of dots.

In a first aspect of the present invention, there is provided an image processing apparatus for printing an image on a printing medium with a plurality of relative movement between a print head capable of printing dots of a plurality of sizes on the printing medium and the printing medium comprising: a binarization unit configured to generate binary data for printing each of the dots of the plurality of sizes with each of the plurality of relative movements, based upon multi-valued image data, wherein the binarization unit generates the binary data such that in the same region of the printing medium, a low frequency component of space frequency characteristics of a dot pattern obtained by accumulating dot patterns printed respectively by the plurality of relative movements in regard to a dot of a first size among the dots of the plurality of sizes is smaller than a low frequency component of space frequency characteristics of a dot pattern obtained by accumulating dot patterns printed respectively by the plurality of relative movements in regard to a dot of a second size among the dots of the plurality of sizes.

In a second aspect of the present invention, there is provided an image processing apparatus for printing an image on a printing medium with a plurality of relative movements between a print head capable of printing dots having a plurality of densities on the printing medium and the printing medium comprising: a binarization unit configured to generate binary data for printing each of the dots having the plurality of densities with each of the plurality of relative movements, based upon multi-valued image data, wherein the binarization unit generates the binary data such that in the same region of the printing medium, a low frequency component of space frequency characteristics of a dot pattern obtained by accumulating dot patterns printed respectively by the plurality of relative movements in regard to a dot having a first density among the dots having the plurality of densities is smaller than a low frequency component of space frequency characteristics of a dot pattern obtained by accumulating dot patterns printed respectively by the plurality of relative movements in regard to a dot having a second density among the dots having the plurality of densities.

In a third aspect of the present invention, there is provided an image processing apparatus for printing an image on a printing medium with a plurality of relative movements between a print head capable of printing a plurality of kinds of dots on the printing medium and the printing medium comprising: a binarization unit configured to generate binary data for printing each of the plurality of kinds of dots with each of the plurality of relative movements, based upon multi-valued image data, wherein the binarization unit generates the binary data such that in the same region of the printing medium, a low frequency component of space frequency characteristics of a dot pattern obtained by accumulating the respective dot patterns of the plurality of kinds of dots in regard to one preceding relative movement among the plurality of relative movements is smaller than a low frequency component of space frequency characteristics of a dot pattern obtained by accumulating the respective dot patterns of the plurality of kinds of dots in regard to one subsequent relative movement among the plurality of relative movements.

In a fourth aspect of the present invention, there is provided an image processing method for printing an image on a printing medium with a plurality of relative movements between a print head capable of printing dots of a plurality of sizes on the printing medium and the printing medium comprising: a binarization step for generating binary data for printing each of the dots of the plurality of sizes with each of the plurality of relative movements, based upon multi-valued image data wherein in the binarization step, the binary data is generated such that in the same region of the printing medium, a low frequency component of space frequency characteristics of a dot pattern obtained by accumulating dot patterns printed respectively by the plurality of relative movements in regard to a dot of a first size among the dots of the plurality of sizes is smaller than a low frequency component of space frequency characteristics of a dot pattern obtained by accumulating dot patterns printed respectively by the plurality of relative movements in regard to a dot of a second size among the dots of the plurality of sizes.

In a fifth aspect of the present invention, there is provided an image processing method for printing an image on a printing medium with a plurality of relative movements between a print head capable of printing dots having a plurality of densities on the printing medium and the printing medium comprising: a binarization step for generating binary data for printing each of the dots having the plurality of densities with each of the plurality of relative movements, based upon multi-valued image data wherein in the binarization step, the binary data is generated such that in the same region of the printing medium, a low frequency component of space frequency characteristics of a dot pattern obtained by accumulating dot patterns printed respectively by the plurality of relative movements in regard to a dot having a first density among the dots having the plurality of densities is smaller than a low frequency component of space frequency characteristics of a dot pattern obtained by accumulating dot patterns printed respectively by the plurality of relative movements in regard to a dot having a second density among the dots having the plurality of densities.

In a sixth aspect of the present invention, there is provided an image processing method for printing an image on a printing medium with a plurality of relative movements between a print head capable of printing a plurality of kinds of dots on the printing medium and the printing medium comprising: a binarization step for generating binary data for printing each of the plurality of kinds of dots with each of the plurality of relative movements, based upon multi-valued image data, wherein in the binarization step, the binary data is generated such that in the same region of the printing medium, a low frequency component of space frequency characteristics of a dot pattern obtained by accumulating the respective dot patterns of the plurality of kinds of dots in regard to one preceding relative movement among the plurality of relative movements is smaller than a low frequency component of space frequency characteristics of a dot pattern obtained by accumulating the respective dot patterns of the plurality of kinds of dots in regard to one subsequent relative movement among the plurality of relative movements.

Further features of the present invention will become apparent from the following description of exemplary embodiments (with reference to the attached drawings).

BRIEF DESCRIPTION OF THE DRAWINGS

FIGS. 2A to 2C are diagrams showing configuration examples of a print head;

FIG. 9 is a diagram showing a storage state of thresholds in a threshold matrix;

FIG. 10B is a schematic diagram showing the calculation process in Embodiment 1;

FIG. 11 is a diagram showing the process in which binarization results are accumulated according to the priority order numbers;

FIGS. 12A and 12B are diagrams showing dot arrangements and space frequency characteristics;

FIG. 14 is a diagram showing the relationship of FIGS. 14A and 14B;

FIG. 14A is a diagram showing the calculation process of halftone processing in Embodiment 3;

FIG. 14B is a diagram showing the calculation process of halftone processing in Embodiment 3;

FIG. 18 is a diagram showing a storage state of thresholds in a threshold matrix in Embodiment 4.

DESCRIPTION OF THE EMBODIMENTS

Hereinafter, preferred embodiments of the present invention will be in detail explained with reference to the attached drawings. It should be noted that the configuration shown in each of the following embodiments is adopted simply as an example, and the present invention is not limited to the shown configurations.

Embodiment 1

Figure 1:
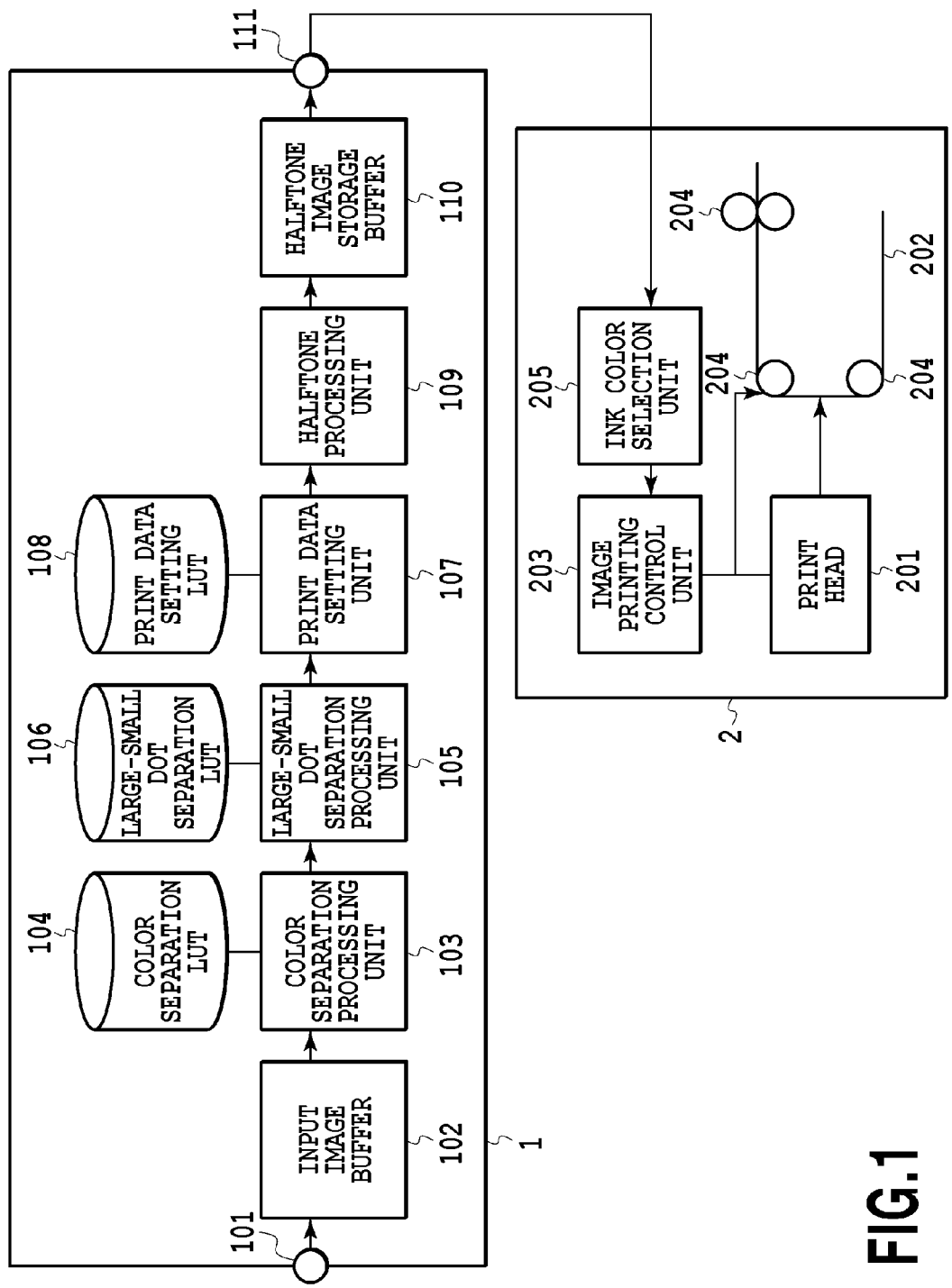
FIG. 1 is a block diagram showing the configuration of each of an image processing apparatus and an image printing method.

FIG. 1 is block diagrams each showing the configuration of each of an image processing apparatus and an image printing apparatus that are applicable to Embodiment 1. In the figure, an image processing apparatus 1 and an image printing apparatus 2 are connected by an interface or a circuit. The image processing apparatus 1 may be composed of, for example, a general personal computer. In that case, functions of the image processing apparatus 1 that will be hereinafter described are realized by executing predetermined programs. However, the image printing apparatus 2 may include the functions of the image processing apparatus 1 together. In the present embodiment, the image printing apparatus 2 is configured of a full line type color inkjet printing apparatus.

The image processing apparatus 1 stores colored image data as printing targets that are input from an image data input terminal 101 (hereinafter, referred to as "color input image data") in an input image buffer 102. The color input image data is configured by multi-valued data composed of three color components of red (R), green (G), and blue (B).

A color separation processing unit 103 converts the color input image data stored in the input image buffer 102 into image data corresponding to ink colors to be used in the image printing apparatus 2. Specifically by referring to a color separation lookup table (LUT) 104, multi-valued brightness data of red (R), green (G), and blue (B) are converted into multi-valued density data of cyan (C), magenta (M), yellow (Y), and black (K).

A large-small dot separation processing unit 105 refers to a large-small dot separation LUT 106 to separate each of the multi-valued density data CMYK after color separation processing into large-dot multi-valued data and small-dot multi-valued data. Hereinafter, the large-dot multi-valued data corresponding to the respective ink colors are indicated at C_L, M_L, Y_L and K_L, and the small-dot multi-valued data corresponding to the respective ink colors are indicated at C_S, M_S, Y_S and K_S.

A print data setting unit 107 further distributes the large-dot multi-valued data and the small-dot multi-valued data separately to two print heads capable of ejecting ink of the same color and the same size, based upon a print data setting LUT 108.

A halftone processing unit 109 binarizes the large-dot multi-valued data and the small-dot multi-valued data corresponding to the respective print heads by a dither method using a threshold matrix, and outputs one-bit data defining print (1) of dots or non-print (0) of dots. It should be noted that the threshold matrix used in the present embodiment is, though the details will be described later, produced to have blue noise characteristics. The threshold matrix having the blue noise characteristics is generally produced such that a dot pattern expressing some gradation has a desired dispersing quality. At this time, the gradation, in which the dot pattern has been established the earlier, has the higher freedom of a dot arrangement, and the multi-valued data can be converted into one-bit data of a dot pattern with the better dispersing quality. In the present embodiment, the dot pattern is determined in order from the smaller gradation to be expressed (smaller number of dots). Therefore the smaller gradation expressed by the multi-valued data is converted into one-bit data having the higher dispersing quality. The binary data having been converted is accumulated in a halftone image storage buffer 110 for each print head and for each dot size, and thereafter is output to the image printing apparatus 2 by an output terminal 111.

In the image printing apparatus 2, a print head 201 performs an ejection operation to a printing medium 202 moving relatively thereto according to the binary data to print an image on the printing medium 202. An ink color selecting unit 205 associates the binary data output from the image processing apparatus 1 with the respective print heads for transmission. An image printing control unit 203 controls a conveying unit 204 in the apparatus to convey the printing medium 202. A conveying method of the printing medium 202 may be a general sheet conveying method. The printing medium may be a continuous sheet or a cut sheet.

FIGS. 2A to 2C are diagrams explaining the configuration of the print head 201. As shown in FIG. 2A, the image printing apparatus 2 is provided with the print head 201 of a full line type in which printing elements ejecting ink are arrayed in an x direction, the print head 201 comprising eight print heads arranged in parallel in the conveying direction (y direction) of the printing medium. In the individual print head, the printing elements have the array resolution of 1200 dpi and array length of 17 inch in the x direction. In the figure, H-K1 and H-K2 eject black ink, H-C1 and H-C2 eject cyan ink, H-M1 and H-M2 eject magenta ink, and H-Y1 and H-Y2 eject yellow ink. In this configuration, the printing medium 202 is conveyed in the y direction at a predetermined speed, and ink is ejected according to the binary data from the individual printing element in a frequency corresponding to the conveying speed. Thereby it is possible to print a color image having the resolution of 1200 dpi and the width of 17 inch on the printing medium.

FIGS. 2B and 2C are diagrams each showing the array configuration example of printing elements in the print head 201. FIG. 2B shows the print head configuration in a case where the individual printing element 203 can eject two kinds of ink droplets in large and small sizes, such as 8 pl and 4 pl. On the other hand, FIG. 2C shows the configuration in which one print head 201 is provided with two printing element lines, for example, a printing element line for ejecting an ink droplet of 8 pl and a printing element line for ejecting an ink droplet of 4 pl. In the present embodiment, any one of the configurations may be adopted.

It should be noted that each print head may have various configurations other than the configurations shown herein. For example, the print head in which the individual printing elements are arrayed in low resolution in the x direction comprises a plurality of print heads that are arranged in parallel in the y direction to be shifted in the x direction with each other. Further, a plurality of short chips in each of which a fewer printing elements are arrayed in the x direction may be prepared and jointed in the y direction to form a so-called joint head configuration. It should be noted that in regard to the method for ejecting ink from the individual printing element, any method of a piezo method, a thermal method, a continuous method and the like may be adopted.

Figure 3:
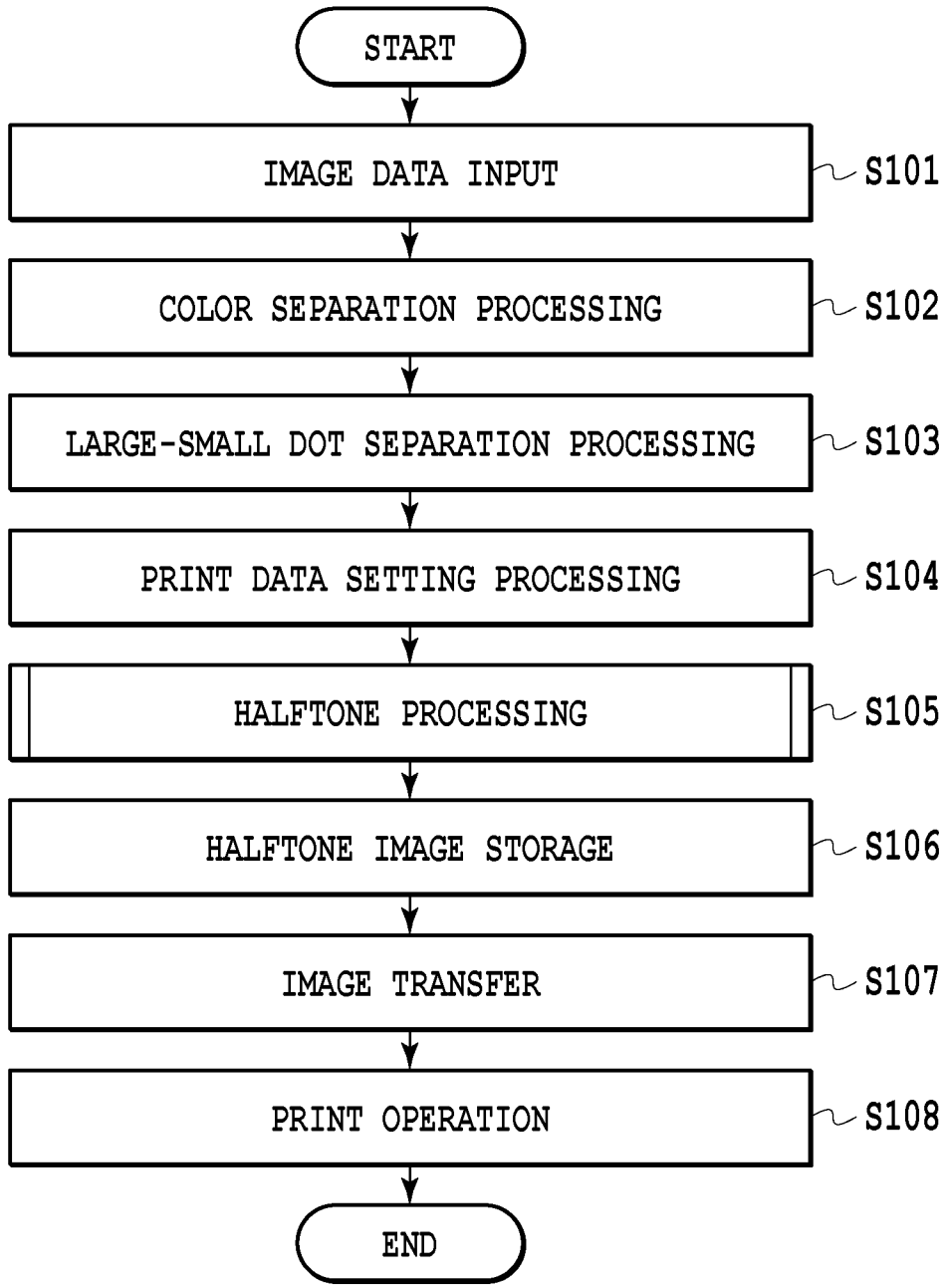
FIG. 3 is a flow chart explaining the process of image processing.

FIG. 3 is a flow chart explaining the process of the processing executed by the image processing apparatus 1 and the image printing apparatus 2 that are applicable to the present embodiment.

First, in step S101 multi-valued color input image data is received from the image data input terminal 101 to be stored in the input image buffer 102. The input image data is multi-valued brightness data composed of three color components of red (R), green (G) and blue (B).

Figure 4:
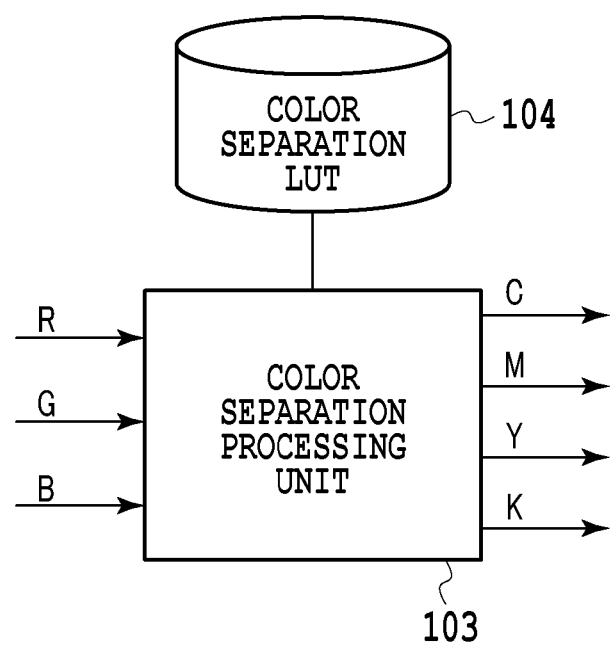
FIG. 4 is a schematic diagram showing input and output of data in a color separation processing unit.

Next, in step S102 the color separation processing unit 103 refers to the color separation LUT 104 to convert the multi-valued brightness data of R, G and B into multi-valued density data of C, M, Y and K. In the present embodiment, each of the multi-valued brightness data and the multi-valued density data is dealt as 256 gradations of eight bits, but may have the gradation number other than that. FIG. 4 is a schematic diagram showing input and output of data in the color separation processing unit 103. The color separation LUT 104 is, as shown in the following expressions, defined as a three-dimensional lookup table (LUT) in which each of four density data (C, M, Y and K) is associated with a combination of three multi-valued brightness data (R, G and B) one-to-one.

C=C_LUT (R, G and B)
M=M_LUT (R, G and B)
Y=Y_LUT (R, G and B)
K=K_LUT (R, G and B)

Hereinafter, the process of step S103 to step S106 is executed for each of ink colors of CMYK. In step S103, the large-small dot separation processing unit 105 refers to the large-small dot separation LUT 106 to separate the multi-valued density data C, M, Y and K of the respective colors into large-dot multi-valued data and small-dot multi-valued data.

Figure 5:
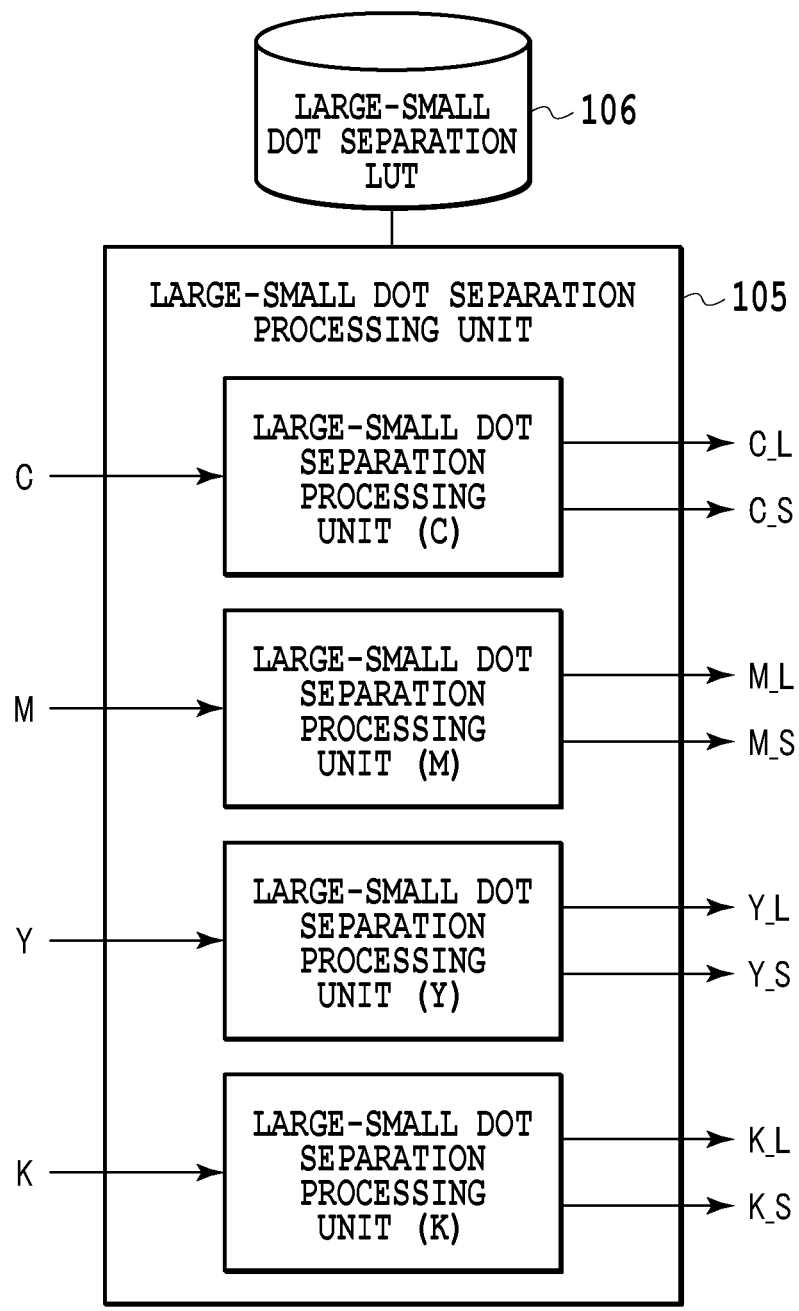
FIG. 5 is a schematic diagram showing input and output of data in a large-small dot separation processing unit.

FIG. 5 is a schematic diagram showing input and output of data in the large-small dot separation processing unit 105. The large-small dot separation LUT 106 is a one-dimensional LUT in which each of the large-dot multi-valued data C_L, M_L, Y_L and K_L and each of the small-dot multi-valued data C_S, M_S, Y_S and K_S are associated with the multi-valued density data of each of the colors (C, M, Y and K).

C_L=C_L_LUT (C)
C_S=C_S_LUT (C)
M_L=M_L_LUT (M)
M_S=M_S_LUT (M)
Y_L=Y_L_LUT (Y)
Y_S=Y_S_LUT (Y)
K_L=K_L_LUT (K)
K_S=K_S_LUT (K)

In step S104 the print data setting unit 107 refers to the print data setting LUT 108 to distribute the large-dot multi-valued data and the small-dot multi-valued data of each color respectively to two print heads. For example, large-dot multi-valued data of cyan is distributed to two print heads (H-C1 and H-C2 in FIG. 2A) that can eject large dots of cyan. Hereinafter, an explanation will be made of a case of processing image data of cyan as an example. The other colors can be processed similarly.

A distribution ratio upon distributing large-dot multi-valued data C_L and small-dot multi-valued data C_S to two print heads (H-C1 and H-C2) is stored in the print data setting LUT 108 as follows.

D_C_H1_L (n)=0.5
D_C_H2_L (n)=0.5
D_C_H1_S (n)=0.5
D_C_H2_S (n)=0.5

In the above expression, "n" in the parenthesis is a variable showing each position of a plurality of printing elements arrayed in the print head. In addition, D_C_H1_L (n) shows a distribution ratio for distributing the large-dot multi-valued data to H-C1 (hereinafter, print head 1), and D_C_H2_L (n) shows a distribution ratio for distributing the large-dot multi-valued data to H-C2 (hereinafter, print head 2). In addition, D_C_H1_S (n) shows a distribution ratio for distributing the small-dot multi-valued data C_S to the print head 1, and D_C_H2_L (n) shows a distribution ratio for distributing the small-dot multi-valued data C_S to the print head 2. Herein the multi-valued data C_L is distributed to each of the print head 1 and the print head 2 half and half (0.5), but the distribution ratio can be set to any ratio according to a position (n) of the printing element. However, it is preferable to establish the following relational expressions for maintaining the density (ink amount) shown by the multi-valued data prior to distribution.

D_C_H1_L (n)+D_C_H2_L (n)=1.0
D_C_H1_S (n)+D_C_H2_S (n)=1.0

Figure 6:
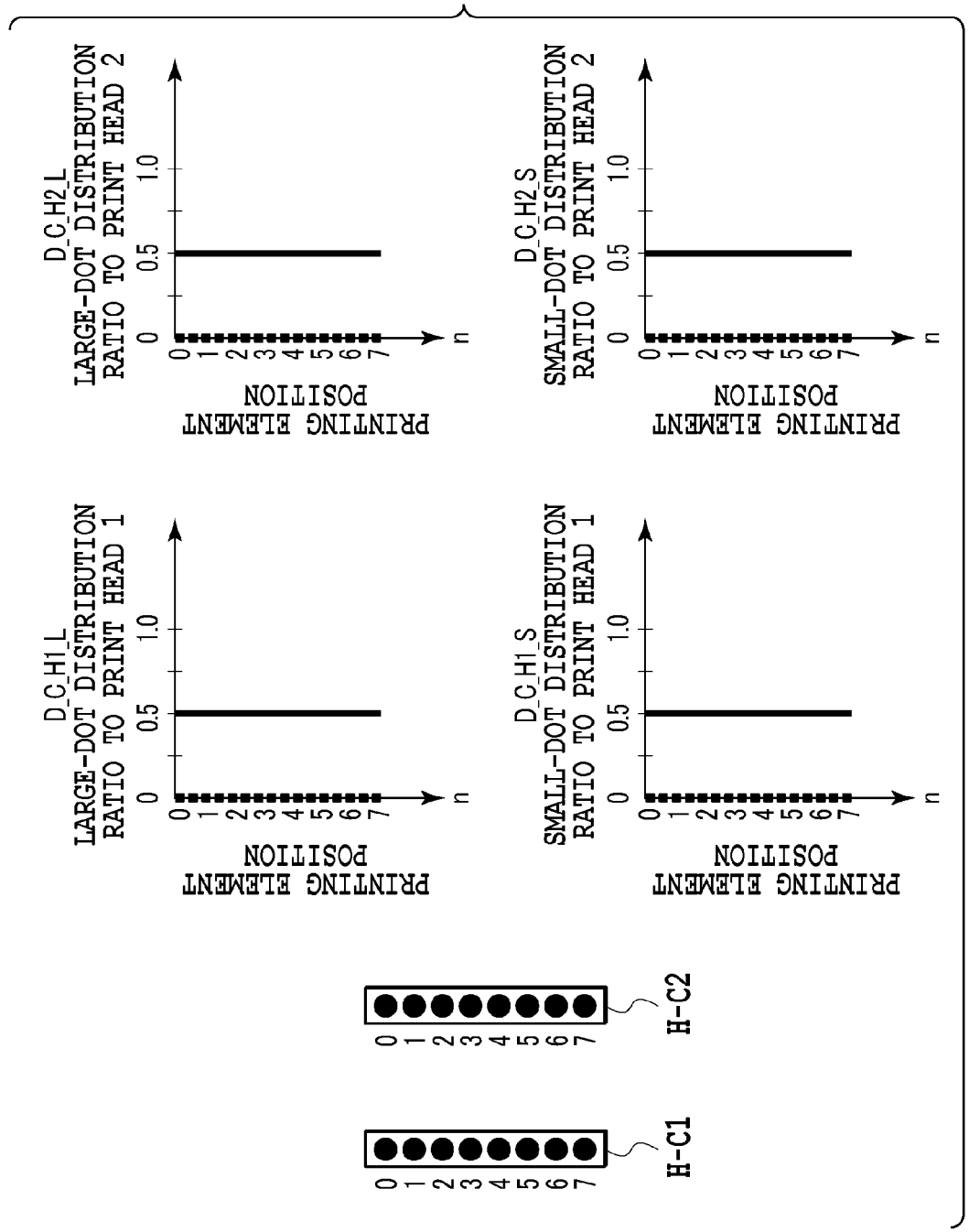
FIG. 6 is a diagram showing a relation between a printing element position (n) and a distribution ratio.

FIG. 6 is graphs showing a relation between a printing element position (n) and a distribution ratio in a case where the distribution ratio (n) is equally 0.5 in all the printing element positions in each of the print head 1 and the print head 2.

In the present embodiment, however, at the time of distributing the multi-valued data (C_L and C_S) to the print head 1 and the print head 2, upper data and lower data are prepared for the individual print head, and these data are separately managed. This configuration is provided for the halftone processing to be described later. Therefore in regard to the distribution ratio, the distribution ratio associated with each of the upper data and the lower data is prepared.

U_C_LUT (1, 0)=0.0
O_C_LUT (1, 0)=D_C_H1_L (n)=0.5
U_C_LUT (2, 0)=0.0
O_C_LUT (2, 0)=D_C_H2_L (n)=0.5
U_C_LUT (1, 1)=0.0
O_C_LUT (1, 1)=D_C_H1_S (n)=0.5
U_C_LUT (2, 1)=0.0
O_C_LUT (2, 1)=D_C_H2_S (n)=0.5

In the above expression, O_C_LUT shows a distribution ratio of the upper data and U_C_LUT shows a distribution ratio of the lower data. In the parenthesis, a first variable shows 1 as the print head 1 and 2 as the print head 2. A second variable shows 0 as a large dot and 1 as a small dot. In the present example, the distribution ratio of the upper data is commonly 0.5, and the distribution ratio of the lower data is commonly 0.0. It should be noted that the distribution ratio is likewise given to ink colors other than cyan.

Hereinafter, a calculating process wherein, using the above-mentioned distribution ratio, the lower data (U_C_d) and upper data (O_C_d) corresponding to the print head 1 and the print head 2 are actually calculated from the large-dot multi-valued data C_L and the small-dot multi-valued data C_S will be explained. Herein there are shown distribution expressions in a case where each of large dots and small dots has a print density of approximately 30%, that is, in a case where each of the large-dot multi-valued data C_L and the small-dot multi-valued data C_S is 76.5 (255×30/100) in all the pixels. It should be noted that in the parenthesis, as similar to the above expressions, a first variable shows 1 as the print head 1 and 2 as the print head 2. A second variable shows 0 as a large dot and 1 as a small dot.

U_C_d (1, 0)
=C_L×U_C_LUT (1, 0)
=76.5×0.0
=0
O_C_d (1, 0)
=C_L×O_C_LUT (1, 0)
=76.5×0.5
=38.25
U_C_d (2, 0)
=O_C_d (1, 0)+C_L×U_C_LUT (2, 0)
=38.25+76.5×0.0
=38.25
O_C_d (2, 0)
=O_C_d (1, 0)+C_L×O_C_LUT (2, 0)
=38.25+76.5×0.5
=76.5
U_C_d (1, 1)
=O_C_d (2, 0)+C_S×U_C_LUT (1, 1)
=76.5+76.5×0.0
=76.5
O_C_d (1, 1)
=O_C_d (2, 0)+C_S×O_C_LUT (1, 1)
=76.5+76.5×0.5
=114.75
U_C_d (2, 1)
=O_C_d (1, 1)+C_S×U_C_LUT (2, 1)
=114.75+76.5×0.0
=114.75
O_C_d (2, 1)
=O_C_d (1, 1)+C_S×O_C_LUT (2, 1)
=114.75+76.5×0.5
=153

In the present embodiment, the lower data U_C_d and the upper data O_C_d are thus calculated in regard to the large dot in the print head 1, the large dot in the print head 2, the small dot in the print head 1 and the small dot in the print head 2 in that order. In addition, herein the large dot in the print head 1 is defined as priority order number 1, the large dot in the print head 2 is defined as priority order number 2, the small dot in the print head 1 is defined as priority order number 3, and the small dot in the print head 2 is defined as priority order number 4. At this point, it is found out that a value of the previously found U_C_d, that is, the U_C_d the priority order number of which is smaller by one is added to each of U_C_d and O_C_d for offset. Therefore, as each of the calculated lower data U_C_d and the calculated upper data O_C_d has the higher priority order (the smaller priority order number), it can be the smaller value. In the present embodiment as described before, as each value of the calculated lower data U_C_d and the calculated upper data O_C_d is the smaller, the dot is arranged with higher priority in the halftone processing to be described later. Because of this, to a dot pattern having the higher priority order, the higher distribution, that is, the dot arrangement the blue noise characteristics of which are high can be realized. When the upper data O_C_d and the lower data U_C_d to all the priority order numbers are calculated according to the above method, the print data setting processing in step S104 is completed.

The process does back to FIG. 3. In step S105, the halftone processing unit 109 generates binary data for defining print (1) or print (0) of the dot by each of the print heads based upon the upper data and the lower data that are distributed to each print head.

Figure 7:
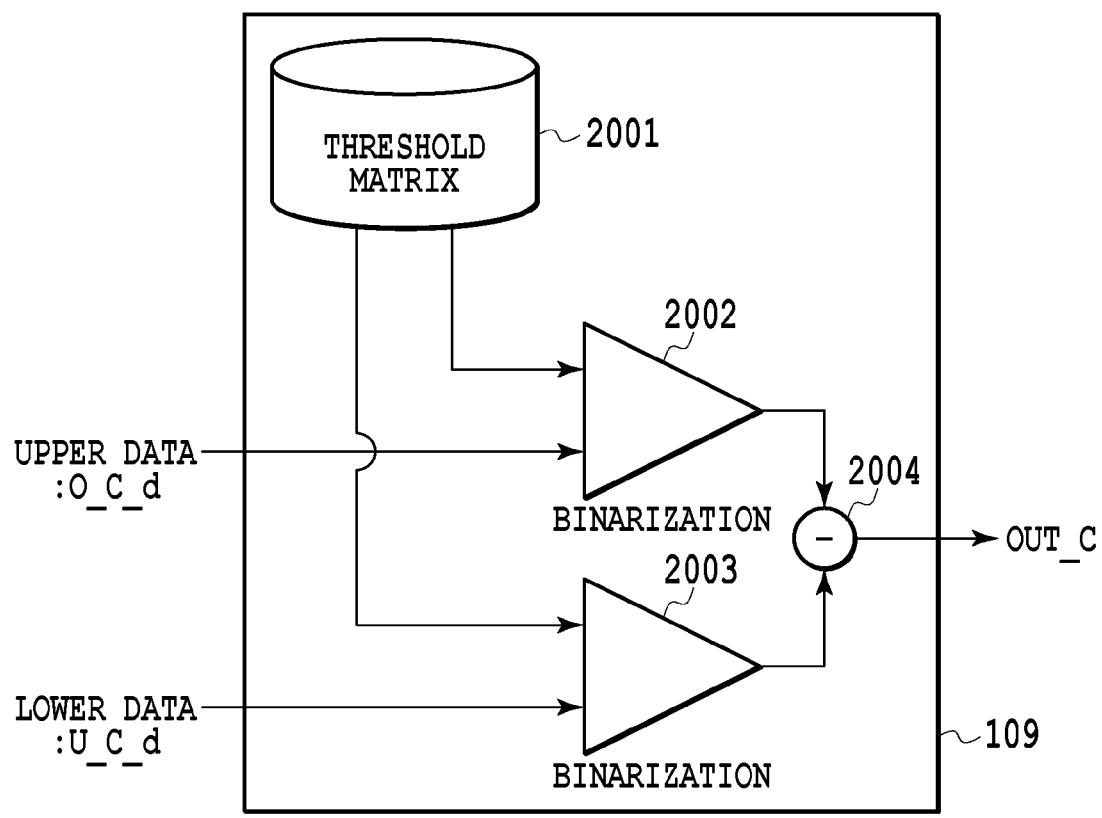
FIG. 7 is a diagram showing the configuration of a halftone processing unit.
Figure 8:
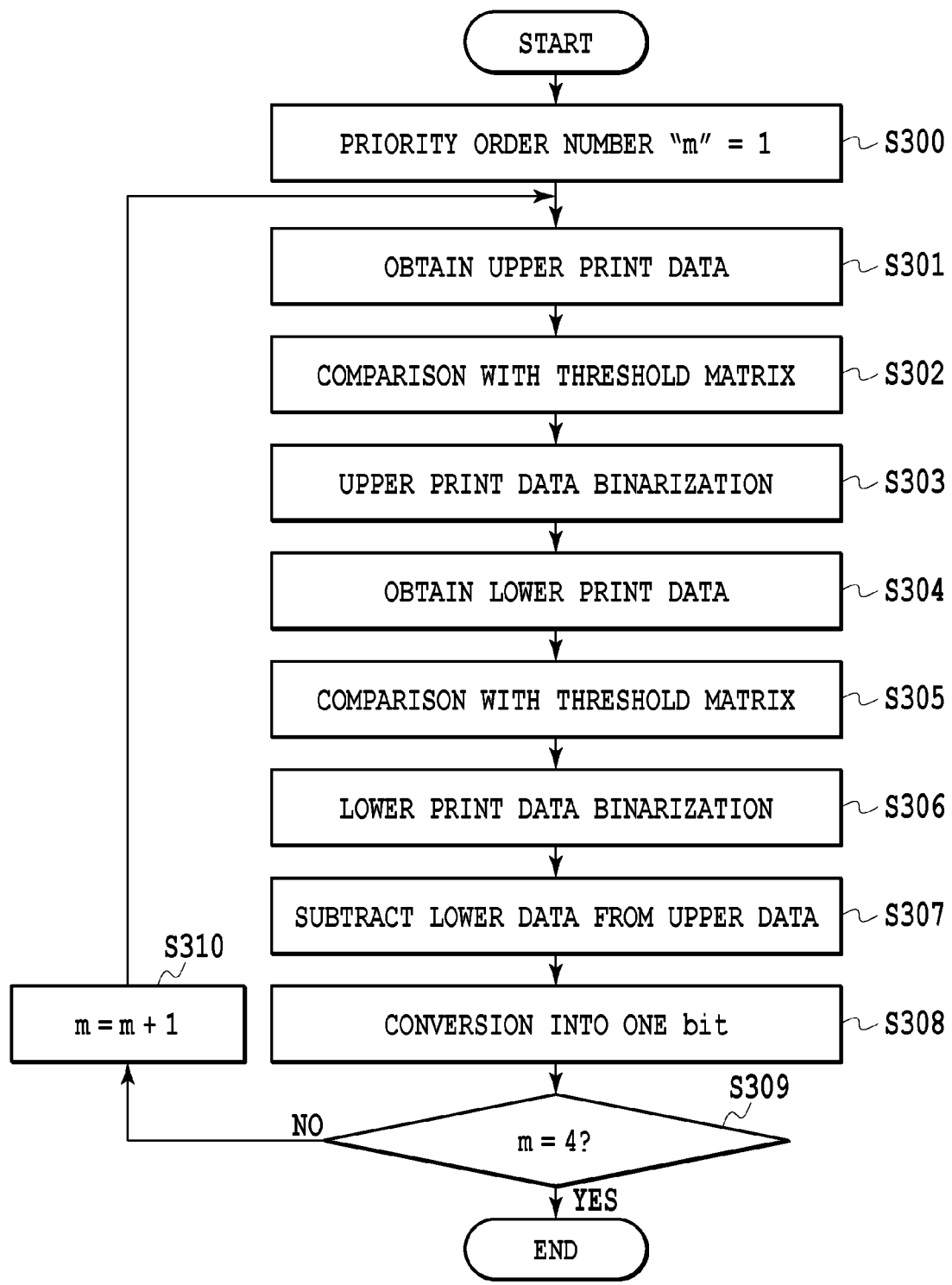
FIG. 8 is a flow chart explaining the process of the halftone processing.

FIG. 7 shows the configuration of the halftone processing unit 109 that is applicable to the present embodiment. FIG. 8 is a flow chart for explaining the process of the halftone processing that is executed by the halftone processing unit 109.

First, in step S300 the priority order number "m" is set to 1. In step S301 subsequent thereto, the upper data O_C_d of the priority order number "m" of interest is received in a binarization unit 2002. The binarization unit 2002 compares the input upper data O_C_d with a predetermined threshold that is stored in a threshold matrix 2001 (step S302).

FIG. 9 is a diagram showing a storage state of a part of thresholds in the threshold matrix 2001. The position where each threshold is stored corresponds to a pixel position of the image data. The binarization unit 2002 compares the upper data O_C_d with the corresponding threshold Th in the threshold matrix 2001, and after that, binarizes it to 0 or 255 depending on a magnitude relation therebetween (Step S303). Specifically When O_C_d<Th, Out_O_C=0
When Th≤O_C_d, Out_O_C=255

The threshold matrix shown in FIG. 9 is partly shown in a region of 4×4 pixels for easy explanation, but actually has a wider region and blue noise characteristics.

In step S304 the lower data U_C_d of the priority order number "m" is likewise received in the binarization unit 2003. The binarization unit 2003 compares the lower data U_C_d with the threshold Th in the threshold matrix 2001 (step S305), and after that, binarizes it to 0 or 255 depending on a magnitude relation therebetween (Step S306). Specifically When U_C_d<Th, Out_U_C=0
When Th≤U_C_d, Out_U_C=255

In step S307 a subtractor 2004 calculates a difference between result Out_O_C that is output from the binarization unit 2002 and result Out_U_C that is output from the binarization unit 2003.

Out_C=Out_O_C−Out_U_C

A 256 value (0 or 255) of eight bits is converted into a binary value (0 or 1) of one bit, which is output as Out_C (step S308).

In step S309 it is determined whether or not the present priority order number "m"=4. In a case where m≠4, in step S310 the priority order number "m" is incremented, and the process goes back to step S301 for executing the processing of the subsequent priority number. On the other hand, in a case where it is determined that "m"=4 in step S309, the present processing ends.

Figures 10, 10A:
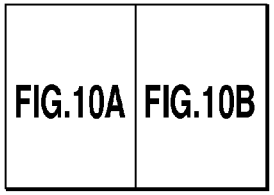
FIG. 10 is a diagram showing the relationship of FIGS. 10A and 10B.
FIG. 10A is a schematic diagram showing the calculation process in Embodiment 1.

FIGS. 10A and 10B are schematic diagrams showing the calculation process in the print data setting processing (step S104) and the halftone processing (step S105) in FIG. 3. Here, a case where the large-dot multi-valued data C_L is "102" in all the pixels and the small-dot multi-valued data C_S is "88" in all the pixels is shown as an example.

In regard to the large dot of print head 1 having the priority order number 1, the upper data O_C_d (1, 0) 2101 is calculated as 102×0.5=51, and the lower data U_C_d (1, 0) 2103 is calculated as 102×0.0=0 by the print data setting unit 107. The halftone processing unit 109 compares each of these values with the threshold matrix 2001 shown in FIG. 9 to obtain the upper data Out_O_C (1, 0) 2102 and the lower data Out_U_C (1, 0) 2104. In the upper data Out_O_C (1, 0) 2102, in the pixel where a threshold equal to or smaller than the input value "51" is set, the data is "255", and in the pixel where a threshold larger than the input value "51" is set, the data is "0" in the threshold matrix 2001. In the lower data Out_U_C (1, 0) 2104, each of all the pixels is a smaller value "0" than the threshold, and therefore in all the pixels, the data becomes "0". As a result, Out_C (1, 0) 2105 is calculated in the subtractor 2004. In this way, in the priority order number 1 (large dot in print head 1), Out_C (1, 0) 2105 becomes a value equal to Out_O_C (1, 0) 2102.

Next, in regard to the priority order number 2 (large dot of print head 2), the upper data O_C_d (1, 0)=51 of the priority order number 1 is added. Because of this, the upper data O_C_d (2, 0) is calculated as 51+102×0.5=102. In regard to the lower data also, the upper data O_C_d (1, 0)=51 of the priority order number 1 is added. Because of this, the lower data U_C_d (2, 0) is calculated as 51+102×0.0=51. The halftone processing unit 109 compares each of these values with the threshold matrix 2001 shown in FIG. 9 to obtain the upper data Out_O_C (2, 0) 2107 and the lower data Out_U_C (2, 0) 2109. In the upper data Out_O_C (2, 0) 2107, in the pixel where a threshold equal to or smaller than the input value "102" is set, the data is "255", and in the pixel where a threshold larger than the input value "102" is set, the data is "0" in the threshold matrix 2001. In the lower data Out_U_C (2, 0) 2109, in the pixel where a threshold equal to or smaller than the input value "51" is set, the data is "255", and in the pixel where a threshold larger than the input value "51" is set, the data is "0" in the threshold matrix 2001. As compared with the priority order number 1 (large dot in print head 1), according to addition of the upper data of the priority order number 1, the pixels set to "255" increase in both of the upper data Out_O_C (2, 0) 2107 and the lower data Out_U_C (2, 0) 2109. As a result, in the subtractor 2004, Out_C (2, 0) 2110 is obtained such that in the pixel position different from the priority order number (large dot of print head 1), the data is "255".

In regard to the priority order number 3 (small dot of print head 1), the upper data O_C_d (2, 0)=102 of the priority order number 2 is added. The upper data U_C_d (1, 1) is calculated as 102+88×0.5=146. In regard to the lower data also, the upper data O_C_d (2, 0)=102 of the priority order number 2 is added, and the lower data U_C_d (1, 1) is calculated as 102+88×0.0=102. The halftone processing unit 109 compares each of these values with the threshold matrix 2001 to obtain the upper data Out_O_C (1, 1) 2112 and the lower data Out_U_C (1, 1) 2114. In the upper data Out_O_C (1, 1) 2112, in the pixel where a threshold equal to or smaller than the input value "146" is set, the data is "255", and in the pixel where a threshold larger than the input value "146" is set, the data is "0" in the threshold matrix 2001. In the lower data Out_U_C (1, 1) 2114, in the pixel where a threshold equal to or smaller than the input value "102" is set, the data is "255", and in the pixel where a threshold larger than the input value "102" is set, the data is "0" in the threshold matrix 2001. As compared with the priority order number 1 or the priority order number 2, according to addition of the upper data of the priority order number 2, the pixels set to "255" increase in both of the upper data Out_O_C (1, 1) 2112 and the lower data Out_U_C (1, 1) 2114. As a result, in the subtractor 2004, Out_C (1, 1) 2115 is obtained such that in the pixel position different from the priority order number 1 or the priority order number 2, the data is "255".

In regard to the priority order number 4 (small dot of print head 2), the upper data O_C_d (1, 1)=146 of the priority order number 3 is added. The upper data O_C_d (2, 1) is calculated as 146+88×0.5=190. In regard to the lower data also, the upper data O_C_d (1, 1)=146 of the priority order number 3 is added, and the lower data U_C_d (2, 1) is calculated as 146+88×0.0=146. The halftone processing unit 109 compares each of these values with the threshold matrix 2001 to obtain the upper data Out_O_C (2, 1) 2117 and the lower data Out_U_C (2, 1) 2119. In the upper data Out_O_C (2, 1) 2117, in the pixel where a threshold equal to or smaller than the input value "190" is set, the data is "255", and in the pixel where a threshold larger than the input value "190" is set, the data is "0" in the threshold matrix 2001. In the lower data Out_U_C (2, 1) 2119, in the pixel where a threshold equal to or smaller than the input value "146" is set, the data is "255", and in the pixel where a threshold larger than the input value "146" is set, the data is "0" in the threshold matrix 2001. As compared with the priority order numbers 1 to 3, according to addition of the upper data of the priority order number 3, the pixels set to "255" further increase in both of the upper data Out_O_C (2, 1) and the lower data Out_U_C (2, 1). As a result, in the subtractor 2004, Out_C (2, 1) 2120 is obtained such that in the pixel position different from the priority order numbers 1 to 3, the data is "255".

When the binarization processing to "255" or "0" in each priority order number is thus completed, the binarization processing unit converts eight bit data (255-value) into a binary value of one bit data. As a result, "255" is converted into "1" indicating that dots are printed, and "0" is becomes "0" indicating that dots are not printed.

According to the above-mentioned configuration, the upper data Out_O_d of the priority order number ("m"−1) is added to the upper data Out_O_d of the priority order number "m". As a result, the pixels that are set to "255" in Out_O_C of the priority order number "m" are composed of the pixels that are set to "255" in Out_O_C of the priority order number ("m"−1) and further, the pixels to be set to "255". In addition, the upper data Out_O_d of the priority order number ("m"−1) is added to the lower data Out_U_d of the priority order number "m". As a result, the pixels that are set to "255" in Out_U_C of the priority order number "m" are composed of the pixels that are set to "255" in Out_U_C of the priority order number ("m"−1) and further, the pixels to be set to "255". Therefore in Out_C obtained from subtraction of Out_O_C and Out_U_C, the positions of the pixels set to "255" are positions of pixels of "255" further added to Out_O_C of the priority order number ("m"−1). As a result, in Out-C of all the priority order numbers, the pixels to each of which "255" is set do not overlap with each other. In this way, in the present embodiment, the upper data is used for defining the pixel for the dot to be actually printed in any priority order number, and the lower data is used for defining the pixel for the dot not to be printed at the same position in a priority order number lower than the above priority order number.

Figure 11:
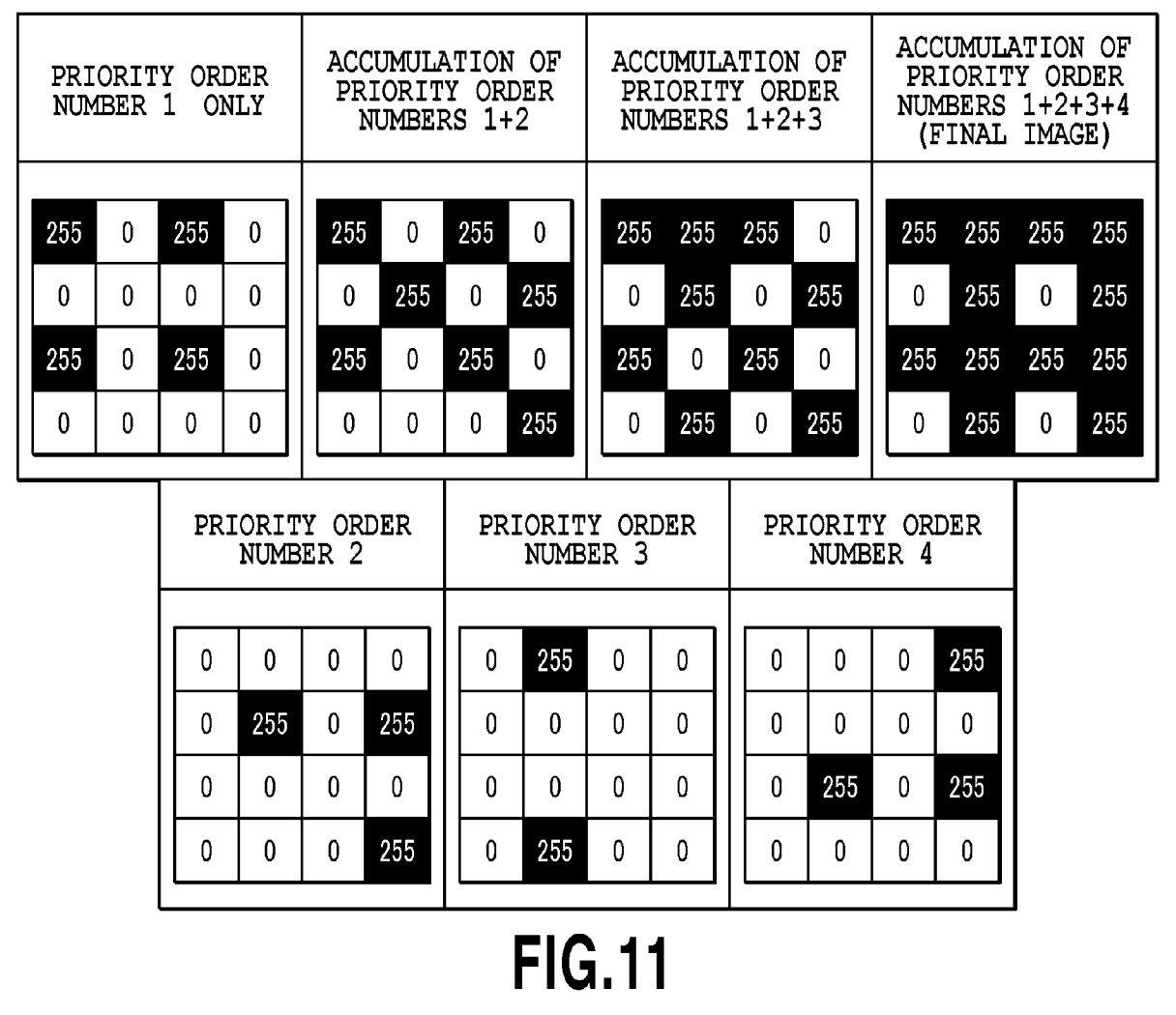

FIG. 11 is diagram showing a state of accumulating (overlapping) Out_C of the priority order number 1 to the priority order number 4 shown in FIGS. 10A and 10B in order. In the binarization processing, the 255-value of eight bits is converted into the binary value of one bit, and in the figure, the pixel to which "255" is set becomes a pixel for printing the dot, and the pixel to which "0" is set becomes a pixel not to print the dot. That is, in Out_C of the priority order number 1 to the priority order number 4, since the pixels for the dot to be printed are in a state exclusive to each other, there is no pixel in which two or more dots overlap to each other in the process of accumulating these and also in the result of having accumulated all of them.

Referring to FIG. 3 again. When the above-described halftone processing (step S105) is completed, the process goes to step S106, wherein the binary data after the halftone processing is stored in the halftone image storage buffer 110. When a predetermined amount of the binary data is accumulated in the halftone image storage buffer 110, the process goes to step S107, wherein the binary data is transferred to the image printing apparatus 2 through the image output terminal 111 in a state of being associated with the individual print head 201.

Thereafter, the image printing apparatus 2 that has received the binary data performs a print operation according to ink and a dot size corresponding to each of the binary data (step S108). With the above process, a series of the image processing shown in FIG. 3 is finished.

FIGS. 12A and 12B are diagrams showing dot arrangements in a case of executing the processing in the present embodiment, and space frequency characteristics as a result of performing Fourier analysis to the respective dot arrangements. FIG. 12A shows dot arrangements to the priority order numbers 1 to 4 respectively, and dot arrangements in the process of accumulating these dot arrangements in order. Herein the large dot is not distinguished over the small dot, but it is possible to confirm that the dispersing quality of dots is relatively high in both of each of the priority order numbers 1 to 4 and the accumulation result of these. More accurately, however, it is possible to confirm that the four dot arrangements in the upper part showing the changing state in which the priority order numbers 1 to 4 are accumulated in order have higher dispersing quality than the dot arrangement of each of the other priority order numbers 2 to 4. Further, the dot arrangement of the priority order numbers 3+4 that is the accumulation result of small dots has the dispersing quality that is not as high as the dot arrangement of the priority order numbers 1+2 that is the accumulation result of large dots. This difference in dispersing quality appears also in graphs shown in FIG. 12B.

FIG. 12B shows the result of performing the Fourier analysis to each of the priority order number 1, the priority order number 2, the priority order numbers 1+2, the priority order numbers 1+2+3+4, and the priority order numbers 3+4. A horizontal axis of each graph shows a space frequency (cycles/mm) and a vertical axis thereof shows an amplitude (power). In any dot pattern, the amplitude of a low-frequency component has more restricted than that of a high-frequency component and it is estimated that there is blue noise characteristics. With such blue noise characteristics, it is possible to realize a dot arrangement that is high in dispersing quality and is visually preferred. This feature can be realized by giving sufficient blue noise characteristics to the threshold matrix 2001 (dither matrix). In particular, according to the present embodiment, in the dot pattern of each step of accumulating the priority order numbers 1 to 4 in order, since the blue noise effect of the dither matrix is directly reflected on the dot pattern, the most excellent dispersing quality can be obtained.

On the other hand, upon comparing only a low-frequency component region of each dot pattern, the amplitude of each of the priority order number 2 and the priority order numbers 3+4 is larger than that of each of the priority order number 1, the priority order numbers 1+2, and the priority order numbers 1+2+3+4. It is estimated that this is because, since these dot patterns are configured such that dot patterns of some priority order numbers are eliminated from the dot patterns in which the blue noise effect is sufficiently reflected, the blue noise effect of the dither matrix is not sufficiently reflected.

In the present embodiment, as described before, the large dot of print head 1 is set to the priority order number 1, the large dot of print head 2 is set to the priority order number 2, the small dot of print head 1 is set to the priority order number 3, and the small dot of print head 2 is set to the priority order number 4. This is because of making the priority order of the large dot in which disturbance in dispersing quality of dots on a printing medium is relatively noticeable higher than that of the small dot. As a result, an accumulation dot pattern of large dots by two print heads is formed as the dot pattern of the priority order numbers 1+2 in FIG. 12A, and likewise an accumulation dot pattern of small dots is formed as the dot pattern of the priority order numbers 3+4 in FIG. 12A. In addition, in regard to frequency characteristics, an accumulation dot pattern of large dots is formed as the dot pattern of the priority order numbers 1+2 in FIG. 12B, and likewise an accumulation dot pattern of small dots is formed as the dot pattern of the priority order numbers 3+4 in FIG. 12B. In the present embodiment, in this way, blue noise characteristics in the dot pattern of the large dots in which disturbance in dispersing quality of dots tends to be easily noticeable have higher priority than that of the small dots to minimize the disturbance in dispersing quality on an entire image.

Figure 13A:
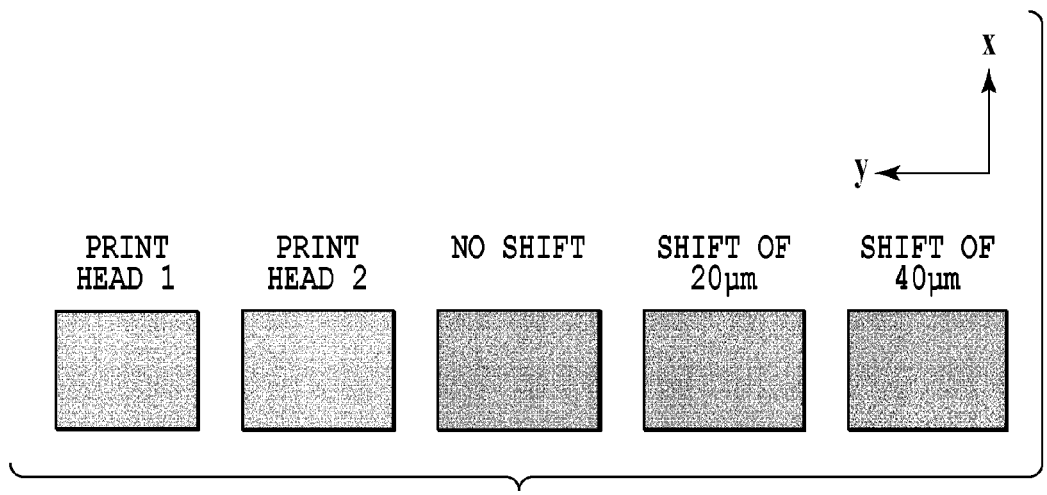
FIGS. 13A and 13B are diagrams each explaining the effect of Embodiment 1.
Figure 13B:
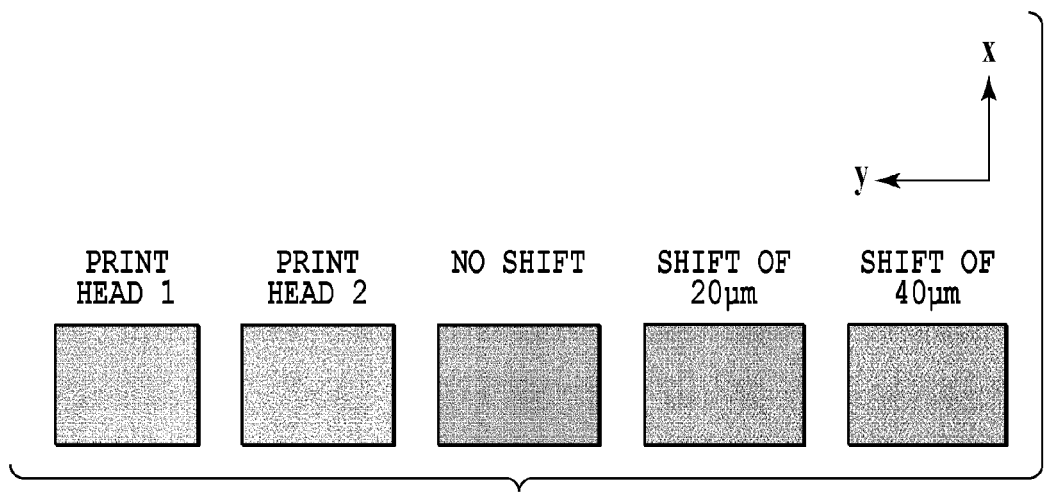

Further, the present embodiment has the feature of placing more importance on the dot dispersing quality by the accumulation of the priority order numbers 1+2 (large dots of print head 1 and large dots of print head 2) than the dot dispersing quality in the single priority order number 2 (large dots of print head 2). FIGS. 13A and 13B are schematic diagrams explaining the effect of this feature.

FIG. 13A is a diagram showing dot patterns in a case of preparing dither matrixes having blue noise characteristics independently for large dots of print head 1 and large dots of print head 2, and dot patterns as a result of accumulating these dot patterns. The accumulated dot patterns respectively show cases each having a positional shift of 0 μm, 20 μm or 40 μm to a y direction between print head 1 and print head 2. In this case, the large dot of print head 1 and the large dot of print head 2 respectively can equally obtain high dispersing quality and blue noise characteristics, but the dispersing quality or blue noise characteristics are not taken into account in the accumulated dot pattern. Accordingly in a state where the dot pattern of print head 1 and the dot pattern of print head 2 are shifted with each other, the blue noise characteristics are greatly damaged and the granularity tends to be easily noticeable.

On the other hand, FIG. 13B shows dot patterns each showing a case of executing the halftone processing with the method according to the present embodiment as similar to FIG. 13A. The blue noise characteristics of the large dot in print head 1 are substantially equal to those in FIG. 13A. In the present embodiment, however, the blue noise characteristics of the accumulation dot pattern by the large dot of print head 1 and the large dot of print head 2 has higher priority than the blue noise characteristics of the dot pattern by the large dot of print head 2 alone. Therefore as compared to FIG. 13A, the sufficient blue noise characteristics are obtained in the accumulation dot pattern where the shift is not generated. Because of this, the blue noise characteristics are not greatly damaged and the granularity is not noticeable even if the dot patterns are shifted each other slightly.

In general, in a dot pattern formed by each of different print heads, it is not rare that print positions by the respective print heads are shifted due to various factors such as floating or inclination of a conveying direction of a sheet. Also in this state, when the sufficient blue noise characteristics can be obtained in the dot pattern as the accumulated result as in the case of the present embodiment, even if the print position shift is slightly generated, it is possible to minimize damages due to the print position shift to output a stable image.

Embodiment 2

In Embodiment 1, an explanation is made of a case where attention is focused on the event that visibility in regard to large dots is higher than that in regard to small dots among dots expressing the same color component to place more importance on the dispersing quality of the large dots than that of the small dots. On the other hand, in the present embodiment, an explanation will be made of an example of focusing attention on excellency of visibility in a highlight portion. Specifically more importance is attached to the dispersing quality of small dots configuring an image of the highlight portion than that of large dots. In the present embodiment, an explanation will be made only of a characteristic configuration different from that of Embodiment 1 by using the inkjet printing apparatus explained with reference to FIGS. 1 to 5 as similar to Embodiment 1.

Here, an explanation will be made of the process of calculating the lower data (U_C_d) and upper data (O_C_d) corresponding to print head 1 and print head 2 from the small-dot multi-valued data C_S and large-dot multi-valued data C_L. Herein distribution expressions in a case where each of small dots and large dots has approximately 30% of print density, that is, in a case where the small-dot multi-valued data C_S and the large-dot multi-valued data each have 76.5 (255×30/100) in all the pixels, are shown as an example. It should be noted that in regard to variables in parentheses, as similar to those in Embodiment 1, a first variable indicates print head 1 at 1, and print head 2 at 2, and a second variable indicates small dots at 1, and large dots at 0.

U_C_d (1, 1)
=C_S×U_C_LUT (1, 1)
=76.5×0.0
=0

O_C_d (1, 1)
=C_S×O_C_LUT (1, 1)
=76.5×0.5
=38.25

U_C_d (2, 1)
=O_C_d (1, 1)+C_S×U_C_LUT (2, 1)
=38.25+76.5×0.0
=38.25

O_C_d (2, 1)
=O_C_d (1, 1)+C_S×U_C_LUT (2, 1)
=38.25+76.5×0.5
=76.5

U_C_d (1, 0)
=O_C_d (2, 1)+C_L×U_C_LUT (1, 0)
=76.5+76.5×0.0
=76.5

O_C_d (1, 0)
 =O_C_d (2, 1)+C_L×O_C_LUT (1, 0)
 =76.5+76.5×0.5
 =114.75
U_C_d (2, 0)
 =O_C_d (1, 0)+C_L×U_C_LUT (2, 0)
 =114.75+76.5×0.0
 =114.75
O_C_d (2, 0)
 =O_C_d (1, 0)+C_L×O_C_LUT (2, 0)
 =114.75+76.5×0.5
 =153

In the present embodiment, the lower data U_C_d and the upper data O_C_d are calculated in regard to the small dot in the print head 1, the small dot in the print head 2, the large dot in the print head 1 and the large dot in the print head 2 in that order. In addition, herein the small dot in the print head 1 is set to the priority order number 1, the small dot in the print head 2 is set to the priority order number 2, the large dot in the print head 1 is set to the priority order number 3, and the large dot in the print head 2 is set to the priority order number 4. At this point, it is found out that a value of the previously found U_C_d, that is, a value of the U_C_d the priority order number of which is smaller by one is added to each of the U_C_d and the O_C_d for offset. When the upper data O_C_d and the lower data U_C_d to all the priority order numbers are calculated according to the above method, the print data setting processing is completed in step S104.

As similar to Embodiment 1, in step S105 in FIG. 3, the halftone processing unit 109 generates binary data for defining print (1) or non-print (0) of the dot by each of the print heads, based upon the upper data and the lower data that are distributed to each print head.

In the present embodiment, as described before, the small dot of print head 1 is set to the priority order number 1, the small dot of print head 2 is set to the priority order number 2, the large dot of print head 1 is set to the priority order number 3, and the large dot of print head 2 is set to the priority order number 4. This is because of making the priority order of the small dot largely used in the highlight portion in which importance is attached to dispersing quality of dots on a printing medium higher than that of the large dot. As a result, as similar to the example shown in FIGS. 12A and 12B of Embodiment 1, in Embodiment 2 an accumulation dot pattern of small dots by two print heads is formed as the dot pattern of the priority order numbers 1+2, and likewise an accumulation dot pattern of large dots is formed as the dot pattern of the priority order numbers 3+4. In addition, in regard to frequency characteristics, an accumulation dot pattern of small dots is formed as the dot pattern of the priority order numbers 1+2, and an accumulation dot pattern of large dots is formed as the dot pattern of the priority order numbers 3+4 in this figure. In the present embodiment, in this way, blue noise characteristics in the dot pattern of the small dots in which the dispersing quality of dots tends to be easily noticeable in the highlight portion have higher priority than that of the large dots to improve the dispersing quality, that is, granularity on an entire image, particularly in the highlight unit.

Further, the present embodiment has, as similar to Embodiment 1, the feature of placing more importance on the dot dispersing quality by the accumulation of the priority order numbers 1+2 (small dots of print head 1 and small dots of print head 2) than the dot dispersing quality in the single priority order number 2 (small dots of print head 2).

As described above, according to the present embodiment, in the dot pattern formed by each of different print heads, importance is attached to the dispersing quality in the arrangement of small dots relatively small in size to print the highlight portion of an image particularly. As a result, a higher-quality image in regard to the highlight portion can be output. Further, as similar to Embodiment 1, when the sufficient blue noise characteristics can be obtained in the dot pattern as the accumulated result in the highlight portion, even if the print position shift is slightly generated, it is possible to minimize damages due to the print position shift to output a stable image.

Embodiment 3

In Embodiment 1, an explanation is made of a case of placing more importance on the dispersing quality of the large dots than that of the small dots. In addition, in Embodiment 2, an explanation is made of a case of placing more importance on the dispersing quality of the small dots than that of the large dots. On the other hand, in the present embodiment, an explanation will be made of an example in which dispersing quality of large dots and small dots that are substantially simultaneously ejected from the same print head has more importance on an image than dispersing quality of large dots each other or small dots each other. Also in the present embodiment, the inkjet printing apparatus explained with reference to FIGS. 1 to 5 will be used as similar to Embodiment 1 and Embodiment 2.

In either the configuration in FIG. 2B or the configuration in FIG. 2C, large dots and small dots that are ejected from the same print head 201 are attached on a sheet at the substantially same timing. In this case, the large dot and the small dot attached on the sheet at the substantially same time come in contact with each other on a surface of the sheet before absorbed in the sheet to be condensed or interfered by surface tension of each other, possibly bringing in a phenomenon called beading. When the beading occurs, since individual dots move from the original positions or combine, the granularity tends to be visually noticeable. On the other hand, since this beading is the phenomenon that occurs between ink droplets of each other ejected at the substantially same time or at an interval of an extremely short time, the beading is hard to occur between dots ejected by two print heads arranged at a distance from each other. That is, in a case where the beading tends to easily occur between the large dot and the small dot that are ejected from the same print head, it is required to attach more importance on dispersing quality of the accumulation result of large dots and small dots by the same print head (or adjacent print heads) than the accumulation result of large dots by the two print heads.

In addition, even if large dots and small dots are further printed on the printing medium on which many dots are already printed, combination or interference between the dots is hard to occur, and the beading is suppressed. That is, it can be said that the problem due to the beading is larger in the large dot and the small dot to be printed on a printing medium more previously than in a combination of the large dot and the small dot to be printed subsequently. The present embodiment is made in view of this problem, and the present embodiment has an object of realizing sufficient dispersing quality in an accumulation dot pattern of large dots and small dots of print head 1 that ejects ink ahead.

Therefore the large dot in the print head 1 is set to the priority order number 1, and the small dot in the print head 2 is set to the priority order number 1. The large dot in the print head 2 that subsequently ejects ink is set to the priority order number 3, and the small dot in the print head 2 is set to the priority order number 4. In step S104 in the flow chart in FIG. 3, lower data U_C_d and upper data O_C_d are calculate according to the above-mentioned priority order numbers as shown in the following expressions.

U_C_d (1, 0)
=C_L×U_C_LUT (1, 0)
=76.5×0.0
=0

O_C_d (1, 0)
=C_L×O_C_LUT (1, 0)
=76.5×0.5
=38.25

U_C_d (1, 1)
=O_C_d (1, 0)+C_S×U_C_LUT (1, 1)
=38.25+76.5×0.0
=38.25

O_C_d (1, 1)
=O_C_d (1, 0)+C_S×O_C_LUT (1, 1)
=38.25+76.5×0.5
=76.5

U_C_d (2, 0)
=O_C_d (1, 1)+C_L×U_C_LUT (2, 0)
=76.5+76.5×0.0
=76.5

O_C_d (2, 0)
=O_C_d (1, 1)+C_L×O_C_LUT (2, 0)
=76.5+76.5×0.5
=114.75

U_C_d (2, 1)
=O_C_d (2, 0)+C_S×U_C_LUT (2, 1)
=114.75+76.5×0.0
=114.75

O_C_d (2, 1)
=O_C_d (2, 0)+C_S×O_C_LUT (2, 1)
=114.75+76.5×0.5
=153

FIGS. 14A and 14B are diagrams showing the calculation process in the halftone processing in the present embodiment. Herein also, as similar to Embodiment 1, a case where the large-dot multi-valued data C_L is "102" in all the pixels and the small-dot multi-valued data is "88" in all the pixels is shown as an example. A method of the substantial halftone processing is the same as in Embodiment 1, and differs only in the priority order number to each of the multi-valued data from Embodiment 1.

Figure 15A:
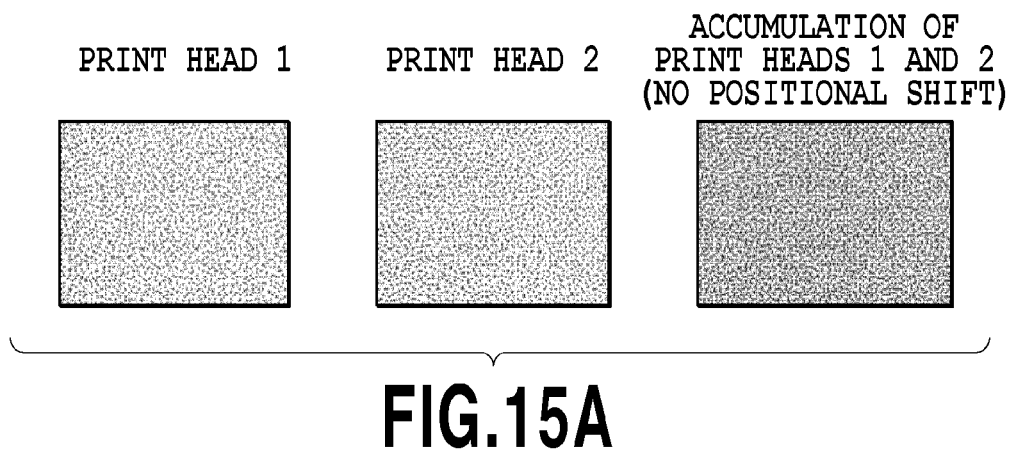
FIGS. 15A and 15B are diagrams each explaining the effect of Embodiment 3.
Figure 15B:
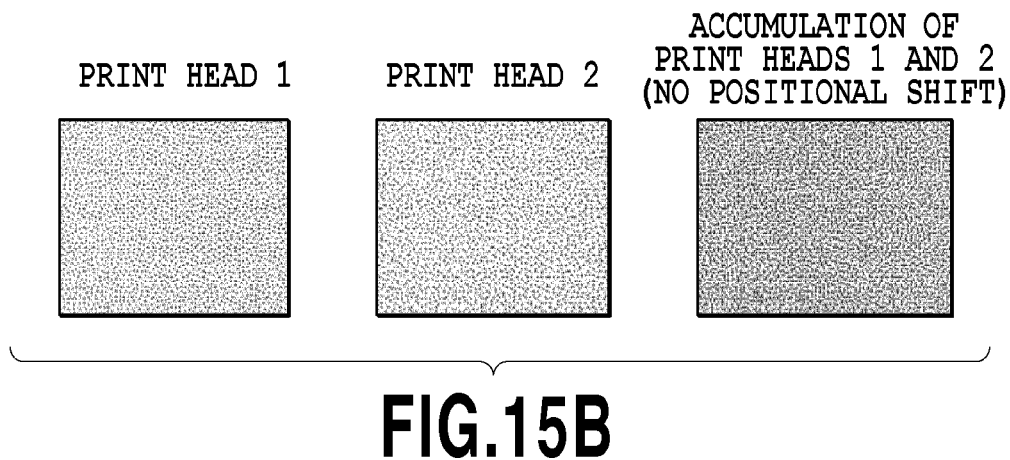

FIGS. 15A and 15B are schematic diagrams explaining the effect of the present embodiment. Here, FIG. 15A are diagrams showing dot patterns of an accumulation result in a case of preparing dither matrixes having blue noise characteristics independently in large dots and small dots of each of print head 1 and print head 2, and a dot pattern as a result of accumulating these. In this case, in regard to each of print head 1 and print head 2, sufficient blue noise characteristics cannot be obtained in the accumulation dot pattern of large dots and small dots. Accordingly a location where the large dot and the small dot printed at the substantially same time interfere with each other occurs, so that beading may be unfortunately generated in print head 1 that performs a print on a printing medium ahead.

On the other hand, FIG. 15B, as in the case of the present embodiment, shows the dot patterns in consideration of being able to obtain high blue noise characteristics as a result of accumulating dot patterns of large dots and small dots printed by the same print head. With this configuration in the present embodiment, sufficient blue noise characteristics can be obtained in the dot pattern as a result of accumulating the dot patterns of large dots and the dot pattern of small dots. As a result, the large dot and the small dot do not interference with each other to suppress the beading.

Embodiment 4

In the three embodiments as described above, one dither matrix having blue noise characteristics as shown in FIG. 9 is prepared, and this dither matrix is used in common to a plurality of print heads and a plurality of dot sizes, thus executing the halftone processing. On the other hand, in the present embodiment, a plurality of dither matrixes for obtaining blue noise characteristics in a result of accumulating the dot patterns are prepared to be associated with a combination of the print head and the dot size. It should be noted that also in the present embodiment, as similar to Embodiment 1, the inkjet printing apparatus explained with reference to FIG. 1 to FIG. 5 is used to execute the image processing according to the flow chart in FIG. 3.

The present embodiment does not prepare data in accordance with the lower data in the above-mentioned embodiment. Further, the order of the distribution processing in step S104 in FIG. 3 is not defined, and a value of the multi-valued data having the high priority order number is not offset to a value of the multi-valued data having the low priority order number. The large-dot multi-valued data and the small-dot multi-valued data are equally distributed to print head 1 and print head 2 according to a distribution ratio (0.5) of each. That is, the distributed multi-valued data is indicated as follows using the first variable (print head) and the second variable (dot size) as similar to the above-mentioned embodiment.

C_d (1, 0)=C_L×0.5
C_d (1, 1)=C_S×0.5
C_d (2, 0)=C_L×0.5
C_d (2, 1)=C_S×0.5

Figure 16:
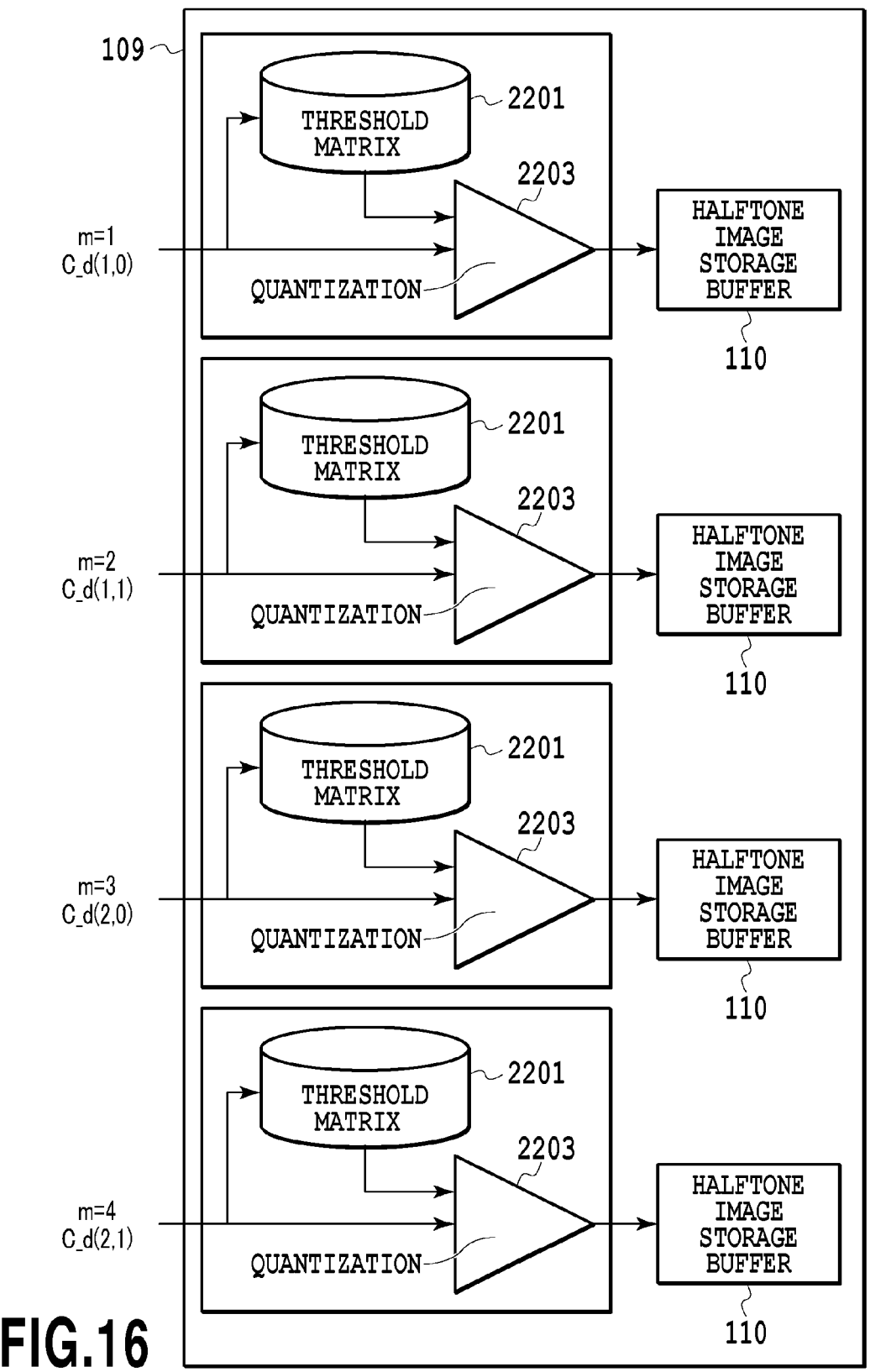
FIG. 16 is a diagram showing the configuration of a halftone processing unit in Embodiment 4.
Figure 17:
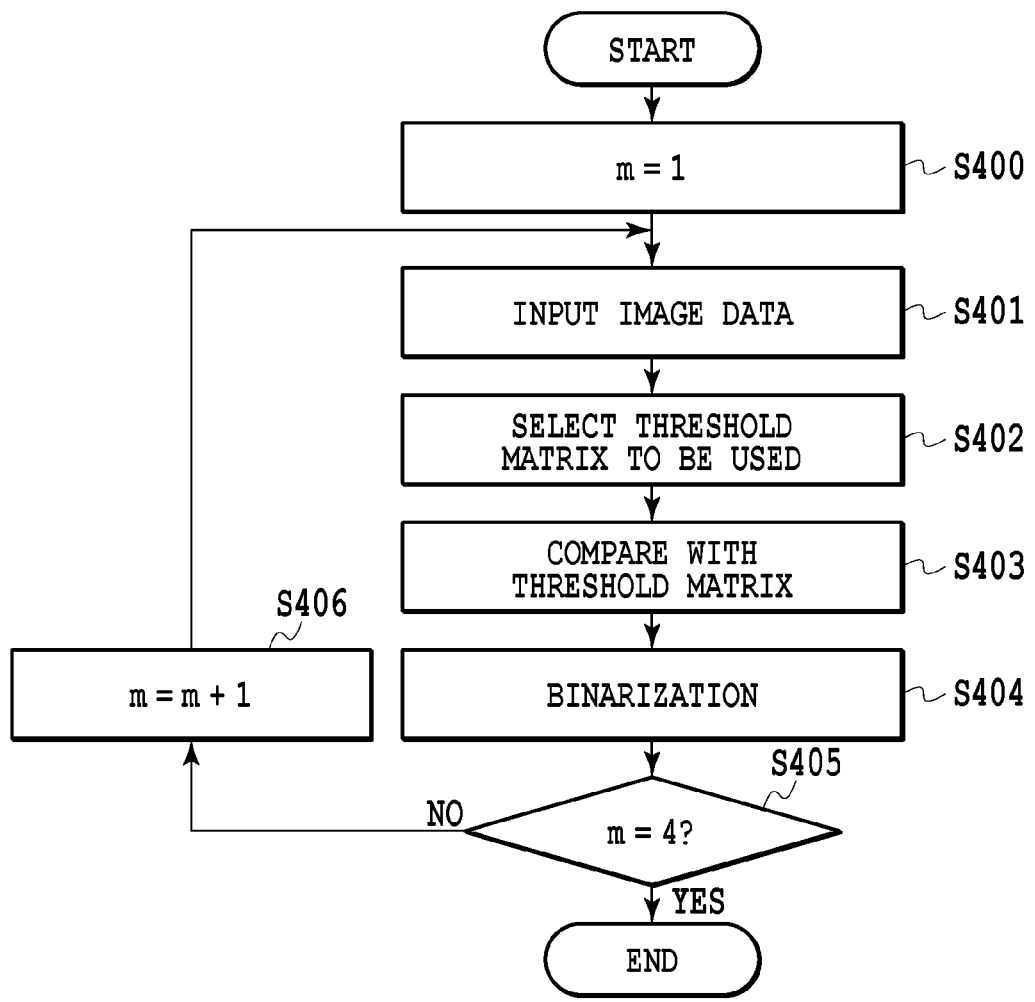
FIG. 17 is a flow chart explaining the process of halftone processing in Embodiment 4.

FIG. 16 shows the configuration of the halftone processing unit 109 that is applicable to the present embodiment. FIG. 17 is a flow chart for explaining the process of the halftone processing in the present embodiment.

When the present processing is started, first in step S400 the priority order number "m" indicating a processing target plane is set to 1. In step S401, multi-valued data C_d corresponding to the variable "m" is input to the binarization unit 2203. By referring to FIG. 16, in the present embodiment, in a case where "m"=1, large dot data C_d (1, 0) of print head 1 is input to the corresponding binarization unit 2203.

In step S402, one corresponding to a value of "m" out of a plurality of threshold matrixes 2201 is selected and set. FIG. 18 is a diagram showing the plurality of threshold matrixes 2201. Herein "n" pieces of matrixes Th_1~Th_n are prepared. When the number "n" of matrixes is "m" or more, it is not particularly limited. The characteristics of threshold matrixes Th_1 to Th_n will be in detail described later.

In step S403 the binarization unit 2203 compares the input multi-valued data C_d with a predetermined threshold Th in the threshold matrix set in step S402, and after that, binarizes it to 0 or 255 depending on a magnitude relation therebetween. Specifically When C_d<Th, Out_C=0
When Th≤C_d, Out_C=255

It should be noted that the threshold matrix shown in FIG. 18 is shown partly using regions each having 4×4 pixels for easy explanation as similar to the above-mentioned embodiment shown in FIG. 9, but actually has a wider region.

In step S404 the 256 (0 or 255)-value of eight bits is converted into a binary value (0 or 1) of one bit, which is output as Out_C.

In step S405 it is determined whether or not "m"=4. In a case where "m"≠4, in step S406 "m" is incremented, and the process goes back to step S401 for executing the processing of the subsequent "m". On the other hand, in a case where it is determined that "m"=4 in step S405, the present processing ends.

It should be noted that the configuration in FIG. 16 is described such that C_d (1, 0) corresponds to "m"=1, C_d (1, 1) corresponds to "m"=2, C_d (2, 0) corresponds to "m"=3, and C_d (2, 1) corresponds to "m"=4, but the present invention is not limited to this corresponding relation. In the present embodiment, the variable "m" is a parameter for simply defining the order of executing from step S402 to step S404, and has no relationship to priority of the dispersing quality. When an appropriate threshold matrix is set to the individual multi-valued data in step S402, even if the steps are executed by the other order, it has no influence on the result after the steps are executed.

Hereinafter, an explanation will be made of the feature on threshold matrixes Th_1 to Th_n in the present embodiment. First, the threshold matrix (dither matrix) Th_1 is configured to have sufficient blue noise characteristics. In addition, when "k" (integral number satisfying the expression of 1=<k<n) is used as the variable, the threshold matrix Th_k has blue noise characteristics in a result of accumulating Th_1 to Th_k in any "k". A plurality of dither matrixes having this feature can be produced by a known method such as simulated annealing or genetic algorithm.

Accordingly, in a case where more importance is attached on large-dot dispersing quality of print head 1 and print head 2 than small-dot dispersing quality thereof, Th_1 and Th_2 may be associated with the multi-valued data corresponding to the large dots of print head 1 and print head 2. Th_3 and Th_4 may be associated with the multi-valued data corresponding to the small dots of print head 1 and print head 2.

On the other hand, as in the case of Embodiment 3, in a case of attaching importance on dispersing quality of large dots and small dots printed by the same print head, Th_1 and Th_2 may be associated with the multi-valued data corresponding to the large dot and the small dot of print head 1. Th_3 and Th_4 may be associated with the multi-valued data corresponding to the large dot and the small dot of print head 2. In this way, when an appropriate threshold matrix is applied to the individual multi-value data to be associated with the priority of attaching importance on dispersing quality of dots, an effect similar to the above-mentioned embodiment can be obtained. Further, according to the present embodiment, since it is not required to manage the upper data and the lower data separately or execute subtraction processing of both as in the case of Embodiment 1 or Embodiment 2, the processing loads can be reduced more than in the above-mentioned embodiment to complete the halftone processing at high speeds.

Other Embodiments

The above-mentioned embodiments are explained by taking the form of preparing large dots and small dots as an example. The present invention can be, however, applied to a case of preparing deep ink relatively high in color material density and light ink relatively low in color material density, although having the same color. For example, when the priority order of deep ink in which disturbance of the dot arrangement tends to be easily visually noticeable is set to be higher than that of light ink, the effect similar to that of Embodiment 1 can be obtained. In addition, in a case where the beading between the deep ink and the light ink is noticeable, when the threshold matrix of attaching importance to the dispersing quality of the result of accumulating a dot pattern of the deep ink and a dot pattern of the light ink is prepared, the effect similar to that of Embodiment 2 can be obtained.

The level of this dot size or the color material density may not be limited to two levels. It may have three levels such as large dots, intermediate dots and small dots or more, or a plurality of dot sizes and a plurality of kinds of color material density may be mixed.

Further, the above-mentioned embodiment is explained by taking the color printer for printing an image using a plurality of inks having different hues, such as cyan, magenta, yellow and black as an example, but the present invention is not limited to this configuration. For example, a monochrome printer for printing an image only with ink having the same hue, such as large dots and small dots of black or deep ink and light ink of black can also sufficiently achieve the effect of the present invention.

In any case, it is important to extract a combination of dots for bringing in the dot pattern having higher dispersing quality in the form of using a plurality of kinds of dots. The above-described image processing may be executed such that sufficient blue noise characteristics can be obtained in the accumulation dot pattern of the extracted combination. It should be noted that in consideration of loads of the processing or the like, attention is focused only on the accumulation dot pattern of the extracted combination, and regular halftone processing may be executed in regard to the dot that has not been extracted. For example, in a case of Embodiment 1, the image data is regarded as three dots composed of large dots of print head 1, large dots of print head 2, and small dots, and the processing as similar to that of Embodiment 1 is executed thereto to produce three dot patterns. In regard to the combination of the small dot of print head 1 and the small dot of print head 2 that have not been extracted, mask processing may be executed to the produced dot pattern, which is divided into two dot patterns. With this configuration also, the effect can be obtained by placing importance particularly on the large dot for enhancing the dispersing quality.

It should be noted that the above-mentioned embodiment is explained by taking the full line type printing apparatus explained in FIGS. 2A to 2C as an example, but the present invention may be applied to a serial type inkjet printing apparatus. For example, in a case of printing an image in the same region of a printing medium with a plurality of relative movements as in the case of Japanese Patent Laid-Open No. 2013-38643, when a first movement is associated with print head 1 of the above-mentioned embodiment and a second movement is associated with second head 2 of the above-mentioned embodiment, the effect as similar to that of the above-mentioned embodiment can be obtained.

Further, in the above description, a series of image processing that is characteristic in the present invention is explained in the form of executing the printing system shown in FIG. 1. The present invention can, however, be realized by supplying a printing medium that stores program codes of software therein for realizing the above-mentioned image processing to the system or apparatus. In this case, a computer (CPU or MPU) of the system or apparatus reads out and executes the computer-readable program code that is stored in the printing medium to realize the function of the above-mentioned embodiment.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-005215, filed Jan. 15, 2014, and No. 2014-233645, filed Nov. 18, 2014, which are hereby incorporated by reference wherein in their entirety.

What is claimed is:

1. An image processing apparatus for printing an image on a printing medium with a plurality of relative movement between a print head capable of printing dots of a plurality of sizes on the printing medium and the printing medium comprising:
a binarization unit configured to generate binary data for printing each of the dots of the plurality of sizes with each of the plurality of relative movements, based upon multi-valued image data,
wherein the binarization unit generates the binary data such that in the same region of the printing medium, a low frequency component of space frequency characteristics of a dot pattern obtained by accumulating dot patterns printed respectively by the plurality of relative movements in regard to a dot of a first size among the dots of the plurality of sizes is smaller than a low frequency component of space frequency characteristics of a dot pattern obtained by accumulating dot patterns printed respectively by the plurality of relative movements in regard to a dot of a second size among the dots of the plurality of sizes.

2. The image processing apparatus according to claim 1, wherein the space frequency characteristics of the dot pattern obtained by the accumulation have blue noise characteristics.

3. The image processing apparatus according to claim 1, wherein the binarization unit converts the multi-valued image data into a plurality of multi-valued data corresponding to the respective combinations of the plurality of relative movements and the plurality of sizes of dots, and thereafter uses one dither matrix having blue noise characteristics in common to each of the plurality of multi-valued data to generate a plurality of binary data corresponding to the respective combinations of the plurality of relative movements and the plurality of sizes of dots.

4. The image processing apparatus according to claim 1, wherein the binarization unit converts the multi-valued image data into a plurality of multi-valued data corresponding to the respective combinations of the plurality of relative movements and the plurality of sizes of dots, and thereafter uses different dither matrixes corresponding to the respective plurality of multi-valued data to generate a plurality of binary data corresponding to the respective combinations of the plurality of relative movements and the plurality of sizes of dots.

5. The image processing apparatus according to claim 1, wherein the plurality of relative movements comprise one relative movement of a plurality of the print heads with respect to the printing medium.

6. The image processing apparatus according to claim 1, wherein the plurality of relative movements comprise a plurality of times of relative movements of the print head with respect to the printing medium.

7. An image processing apparatus for printing an image on a printing medium with a plurality of relative movements between a print head capable of printing dots having a plurality of densities on the printing medium and the printing medium comprising:
a binarization unit configured to generate binary data for printing each of the dots having the plurality of densities with each of the plurality of relative movements, based upon multi-valued image data,
wherein the binarization unit generates the binary data such that in the same region of the printing medium, a low frequency component of space frequency characteristics of a dot pattern obtained by accumulating dot patterns printed respectively by the plurality of relative movements in regard to a dot having a first density among the dots having the plurality of densities is smaller than a low frequency component of space frequency characteristics of a dot pattern obtained by accumulating dot patterns printed respectively by the plurality of relative movements in regard to a dot having a second density among the dots having the plurality of densities.

8. An image processing apparatus for printing an image on a printing medium with a plurality of relative movements between a print head capable of printing a plurality of kinds of dots on the printing medium and the printing medium comprising:
a binarization unit configured to generate binary data for printing each of the plurality of kinds of dots with each of the plurality of relative movements, based upon multi-valued image data,
wherein the binarization unit generates the binary data such that in the same region of the printing medium, a low frequency component of space frequency characteristics of a dot pattern obtained by accumulating the respective dot patterns of the plurality of kinds of dots in regard to one preceding relative movement among the plurality of relative movements is smaller than a low frequency component of space frequency characteristics of a dot pattern obtained by accumulating the respective dot patterns of the plurality of kinds of dots in regard to one subsequent relative movement among the plurality of relative movements.

9. An image processing method for printing an image on a printing medium with a plurality of relative movements between a print head capable of printing dots of a plurality of sizes on the printing medium and the printing medium comprising:

a binarization step for generating binary data for printing each of the dots of the plurality of sizes with each of the plurality of relative movements, based upon multi-valued image data, wherein in the binarization step, the binary data is generated such that in the same region of the printing medium, a low frequency component of space frequency characteristics of a dot pattern obtained by accumulating dot patterns printed respectively by the plurality of relative movements in regard to a dot of a first size among the dots of the plurality of sizes is smaller than a low frequency component of space frequency characteristics of a dot pattern obtained by accumulating dot patterns printed respectively by the plurality of relative movements in regard to a dot of a second size among the dots of the plurality of sizes.

10. A computer-readable storage medium storing computer-executable code of a program that causes a computer to execute the image processing method according to claim 9.

11. An image processing method for printing an image on a printing medium with a plurality of relative movements between a print head capable of printing dots having a plurality of densities on the printing medium and the printing medium comprising:

a binarization step for generating binary data for printing each of the dots having the plurality of densities with each of the plurality of relative movements, based upon multi-valued image data, wherein in the binarization step, the binary data is generated such that in the same region of the printing medium, a low frequency component of space frequency characteristics of a dot pattern obtained by accumulating dot patterns printed respectively by the plurality of relative movements in regard to a dot having a first density among the dots having the plurality of densities is smaller than a low frequency component of space frequency characteristics of a dot pattern obtained by accumulating dot patterns printed respectively by the plurality of relative movements in regard to a dot having a second density among the dots having the plurality of densities.

12. An image processing method for printing an image on a printing medium with a plurality of relative movements between a print head capable of printing a plurality of kinds of dots on the printing medium and the printing medium comprising:

a binarization step for generating binary data for printing each of the plurality of kinds of dots with each of the plurality of relative movements, based upon multi-valued image data, wherein in the binarization step, the binary data is generated such that in the same region of the printing medium, a low frequency component of space frequency characteristics of a dot pattern obtained by accumulating the respective dot patterns of the plurality of kinds of dots in regard to one preceding relative movement among the plurality of relative movements is smaller than a low frequency component of space frequency characteristics of a dot pattern obtained by accumulating the respective dot patterns of the plurality of kinds of dots in regard to one subsequent relative movement among the plurality of relative movements.

13. An image processing apparatus for printing an image on a printing medium with a plurality of relative movements between a print head capable of printing dots of a plurality of sizes on the printing medium and the printing medium, comprising:

a generation unit configured to generate data for printing each of the dots of the plurality of sizes with each of the plurality of relative movements, based upon multi-valued image data, wherein the generation unit generates the data such that in the same region of the printing medium, a low frequency component of space frequency characteristics of a dot pattern obtained by accumulating dot patterns printed respectively by the plurality of relative movements in regard to a dot of a first size among the dots of the plurality of sizes is smaller than a low frequency component of space frequency characteristics of a dot pattern obtained by accumulating dot patterns printed respectively by the plurality of relative movements in regard to a dot of a second size among the dots of the plurality of sizes.

14. An image processing method for printing an image on a printing medium with a plurality of relative movements between a print head capable of printing a plurality of kinds of dots on the printing medium and the printing medium, comprising:

a generation step of generating data for printing each of the plurality of kinds of dots with each of the plurality of relative movements, based upon multi-valued image data, wherein in the generation step, the data is generated such that in the same region of the printing medium, a low frequency component of space frequency characteristics of a dot pattern obtained by accumulating the respective dot patterns of the plurality of kinds of dots in regard to one preceding relative movement among the plurality of relative movements is smaller than a low frequency component of space frequency characteristics of a dot pattern obtained by accumulating the respective dot patterns of the plurality of kinds of dots in regard to one subsequent relative movement among the plurality of relative movements.

* * * * *